US012658566B2

(12) United States Patent
Kim et al.

(10) Patent No.: US 12,658,566 B2
(45) Date of Patent: Jun. 16, 2026

(54) ELECTRONIC DEVICE INCLUDING ANTENNA

(71) Applicant: Samsung Electronics Co., Ltd., Suwon-si (KR)

(72) Inventors: Jongmin Kim, Suwon-si (KR); Eunbae Kwon, Suwon-si (KR); Hyoseok Na, Suwon-si (KR); Kyonghwan Cho, Suwon-si (KR); Sungjae Moon, Suwon-si (KR); Wanjae Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 18/786,248

(22) Filed: Jul. 26, 2024

(65) Prior Publication Data

US 2025/0007148 A1 Jan. 2, 2025

Related U.S. Application Data

(63) Continuation of application No. PCT/KR2024/008981, filed on Jun. 27, 2024.

(30) Foreign Application Priority Data

Jun. 27, 2023 (KR) ........................ 10-2023-0082973
Sep. 1, 2023 (KR) ........................ 10-2023-0116059

(51) Int. Cl.
*H01Q 1/24* (2006.01)
*H01Q 1/38* (2006.01)
*H04M 1/02* (2006.01)

(52) U.S. Cl.
CPC ............... *H01Q 1/243* (2013.01); *H01Q 1/38* (2013.01); *H04M 1/0277* (2013.01)

(58) Field of Classification Search
CPC ........ H01Q 1/243; H01Q 1/38; H04M 1/0277
See application file for complete search history.

(56) References Cited

U.S. PATENT DOCUMENTS 7,541,992 B2 6/2009 Murakami et al.
10,396,434 B2 8/2019 Koo et al.
(Continued)

FOREIGN PATENT DOCUMENTS

CN 216389722 U 4/2022
CN 217740777 U 11/2022
(Continued)

OTHER PUBLICATIONS

Search Report and Written Opinion dated Sep. 30, 2024 issued in International Patent Application No. PCT/KR2024/008981.

*Primary Examiner* — David E Lotter
(74) *Attorney, Agent, or Firm* — Nixon & Vanderhye, P.C.

(57) ABSTRACT

According to an example embodiment of the disclosure, an electronic device is provided. The electronic device includes a front cover forming at least a portion of the front surface of the electronic device, a non-conductive case including a rear portion forming at least a portion of the rear surface of the electronic device and a side portion forming at least a portion of the side surface of the electronic device, a support positioned between the front cover and the non-conductive case and including a first portion and a second portion, wherein the first portion is positioned between the second portion and the side portion, a first conductive pattern disposed between the first portion or the side portion, a second conductive pattern positioned between the second portion and the rear portion and spaced apart from the first conductive pattern, a wireless communication circuit configured to transmit a signal in a designated frequency band through the first conductive pattern and the second conduc- (Continued)

tive pattern, and a seal disposed between the first portion and the rear portion and configured to block fluid flow from a first area where the first conductive pattern is disposed to a second area where the second conductive pattern is disposed.

20 Claims, 12 Drawing Sheets

(56) References Cited

U.S. PATENT DOCUMENTS

| | | | |
|---|---|---|---|
| 11,088,470 | B2 | 8/2021 | Kwon et al. |
| 11,114,747 | B2 | 9/2021 | Ham et al. |
| 11,522,271 | B2 | 12/2022 | Kim et al. |
| 11,848,505 | B2 | 12/2023 | Nakamura et al. |

| | | | |
|---|---|---|---|
| 2013/0214986 | A1 | 8/2013 | Zhu et al. |
| 2015/0245513 | A1* | 8/2015 | Moon ..................... H04M 1/02 |
| | | | 361/679.01 |
| 2016/0124396 | A1 | 5/2016 | Choi et al. |
| 2019/0386380 | A1* | 12/2019 | Ham ..................... H01Q 1/243 |

FOREIGN PATENT DOCUMENTS

| | | | |
|---|---|---|---|
| JP | 2008011116 | A | 1/2008 |
| JP | 5019230 | B2 | 6/2012 |
| KR | 10-2014-0092350 | | 7/2014 |
| KR | 10-2015-0099329 | | 8/2015 |
| KR | 20160052253 | A | 5/2016 |
| KR | 10-2019-0141474 | | 12/2019 |
| KR | 10-2020-0017541 | | 2/2020 |
| KR | 10-2020-0123252 | | 10/2020 |
| KR | 10-2023-0026691 | A | 2/2023 |

* cited by examiner

FIG. 10

| EXEMPLARY ELECTRONIC DEVICE (2) | 1ST FREQUENCY BAND (ABOUT 703MHz~ ABOUT 750MHz) | | | 2ND FREQUENCY BAND (ABOUT 824MHz~ ABOUT 849MHz) | | | 3RD FREQUENCY BAND (ABOUT 880MHz~ ABOUT 915MHz) | | | 4TH FREQUENCY BAND (ABOUT 1710MHz~ ABOUT 1785MHz) | | |
|---|---|---|---|---|---|---|---|---|---|---|---|---|
| | 17.20 | 16.74 | 16.10 | 17.55 | 18.13 | 16.88 | 16.23 | 17.15 | 17.83 | 17.75 | 18.33 | 18.45 |
| ELECTRONIC DEVICE OF 1ST COMPARATIVE EXAMPLE | 17.10 | 16.84 | 16.03 | 15.75 | 16.89 | 16.12 | 15.12 | 18.53 | 16.89 | 16.80 | 17.92 | 18.01 |
| ELECTRONIC DEVICE OF 2ND COMPARATIVE EXAMPLE | 17.10 | 16.84 | 16.03 | 17.94 | 18.68 | 17.19 | 16.67 | 17.66 | 18.26 | 18.02 | 18.53 | 18.51 |

UNIT: dBm

ELECTRONIC DEVICE INCLUDING ANTENNA

CROSS-REFERENCE TO RELATED APPLICATIONS

This application is a continuation of International Application No. PCT/KR2024/008981 designating the United States, filed on Jun. 27, 2024, in the Korean Intellectual Property Receiving Office and claiming priority to Korean Patent Application Nos. 10-2023-0082973, filed on Jun. 27, 2023, and 10-2023-0116059, filed on Sep. 1, 2023, in the Korean Intellectual Property Office, the disclosures of each of which are incorporated by reference herein in their entireties.

BACKGROUND

Field

The disclosure relates to an electronic device including an antenna.

Description of Related Art

With the development of wireless communication technology, electronic devices are commonly used in daily life, and thus use of contents is increasing exponentially. The electronic devices include multiple antennas to support various communication technologies.

The above information may be provided as a related art for the purpose of helping understanding of the disclosure. No claim or determination is made as to whether any of the foregoing may be applied as a prior art related to the disclosure.

As the range of available applications expands, the number of antennas included in electronic devices is increasing. While electronic devices are becoming slimmer, components for various functions such as waterproofing are being added. Therefore, it becomes difficult to position an antenna in a limited space while securing coverage (or communication range) and radiation performance for a desired frequency band, while reducing the electrical effects with various elements within an electronic device.

SUMMARY

Embodiments of the disclosure provide an electronic device including an antenna for securing or improving coverage and/or antenna radiation performance. Various embodiments of the disclosure are provided to address or at least alleviate the above-mentioned problems.

According to an example embodiment of the disclosure, an electronic device is provided. The electronic device includes: a front cover, a non-conductive case, a support, a first conductive pattern, a second conductive pattern, a wireless communication circuit, and a seal. The front cover provides at least a portion of the front surface of the electronic device. The case includes a rear portion and a side portion. The rear portion provides at least a portion of the rear surface of the electronic device. The side portion provides at least a portion of the side surface of the electronic device. The support is positioned between the front cover and the non-conductive case. The support includes a first portion and a second portion. The first portion is positioned between the second portion and the side portion. The first conductive pattern is disposed between the first portion and the side portion. The second conductive pattern is positioned between the second portion and the rear portion. The second conductive pattern is spaced apart from the first conductive pattern. The wireless communication circuit is configured to transmit a signal in a designated frequency band via the first conductive pattern and the second conductive pattern. The seal is disposed between the first portion and the rear portion and configured to block fluid flow from a first area where the first conductive pattern is disposed to a second area where the second conductive pattern is disposed.

According to an example embodiment of the disclosure, an electronic device is provided. The electronic device includes a front cover, a non-conductive case, a support, a first conductive pattern, a second conductive pattern, a wireless communication circuit, and a seal. The front cover provides at least a portion of the front surface of the electronic device. The case includes a rear portion and a side portion. The rear portion provides at least a portion of the rear surface of the electronic device. The side portion provides at least a portion of the side surface of the electronic device. The support is positioned between the front cover and the non-conductive case. The support includes a first portion and a second portion. The first portion is positioned between the second portion and the side portion. The first conductive pattern is disposed between the first portion and the side portion. The second conductive pattern is positioned between the second portion and the rear portion. The second conductive pattern is spaced apart from the first conductive pattern. The wireless communication circuit is configured to transmit a signal in a designated frequency band via the first conductive pattern and the second conductive pattern. The seal is disposed between the first portion and the rear surface. The first conductive pattern and the second conductive pattern are spaced apart from each other with the first portion interposed therebetween, wherein the first portion extends through the seal to connect the support to the rear portion. The first portion includes a non-conductive portion at least partially positioned between the first conductive pattern and the second conductive pattern. Based on feeding from the wireless communication circuit, the first conductive pattern and the second conductive pattern are electromagnetically coupled with the non-conductive portion interposed therebetween.

An electronic device including an antenna according to an example embodiment of the disclosure makes it possible to secure or improve coverage and/or an antenna radiation performance while reducing limitations on the disposition of an antenna due to a structure for waterproofing and/or dustproofing.

In addition, effects that may be obtained by various example embodiments of the disclosure will be directly or implicitly disclosed in the detailed description.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 10 is a table showing TRPs of the example electronic device, the electronic device of the first comparative example, and the electronic device of the second comparative example in each frequency band according to various embodiments.

DETAILED DESCRIPTION

Hereinafter, various example embodiments of the disclosure will be described in greater detail with reference to the accompanying drawings.

Figure 1:
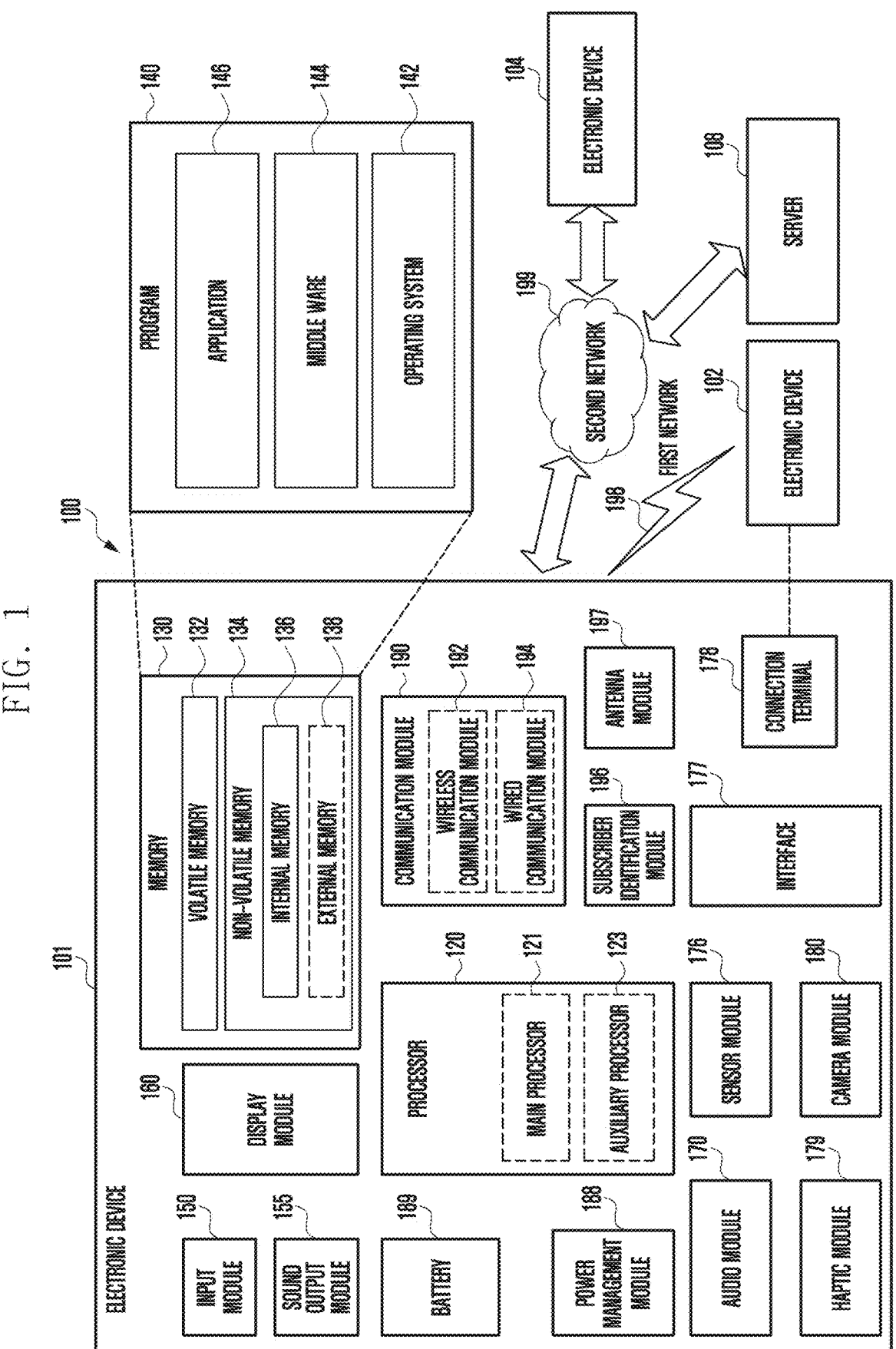
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezo-electric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mm Wave antenna module. According to an embodiment of the disclosure, the mmWave antenna module may include a PCB, an RFIC that is disposed on or adjacent to a first surface (e.g., the bottom surface) of the PCB and is capable of supporting a designated high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
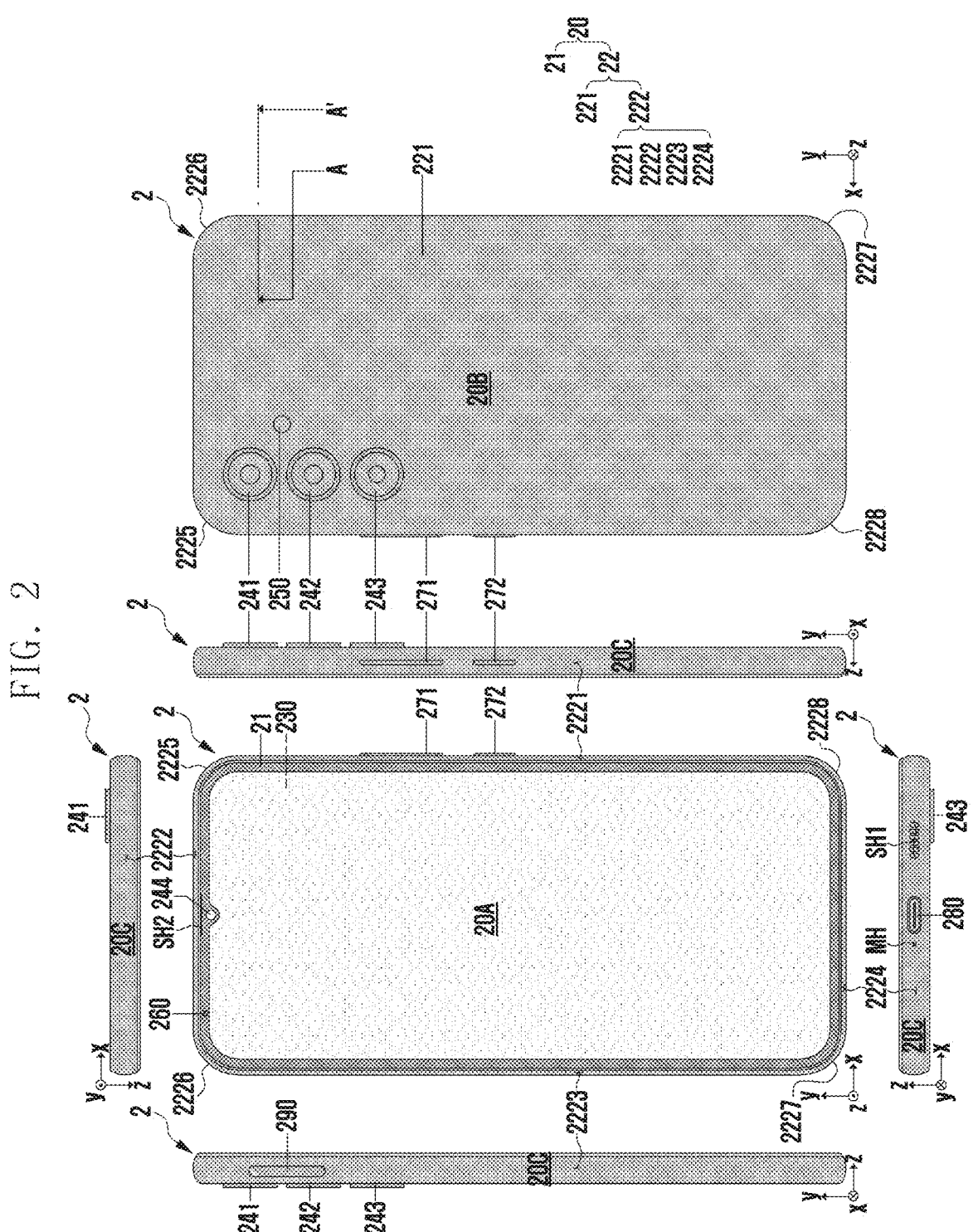
FIG. 2 is a diagram illustrating an example electronic device according to various embodiments.

FIG. 2 is a diagram illustrating an example electronic device 2 according to various embodiments.

In various embodiments of the disclosure, for convenience of explanation, the direction in which the front surface 20A of the example electronic device 2 or a display area included in the front surface is oriented is defined as the +z-axis direction, and the direction in which the rear surface 20B of the example electronic device 2 is oriented is defined as the −z-axis direction.

Referring to FIG. 2, the example electronic device 2 may include a housing 20 that configures (or defines) at least a portion of the appearance of the example electronic device 2. The housing 20 may provide, for example, the front surface 20A of the example electronic device 2, the rear surface 20B of the example electronic device 2, and the side surface 20C of the example electronic device 2. In various embodiments, the housing 20 may refer to a structure that configures at least a portion of the front surface 20A, the rear surface 20B, and/or the side surface 20C.

According to an embodiment, the housing 20 may include a front cover (or a front plate or front part) 21 and a case (or a shell) 22.

According to an embodiment, the front cover 21 may provide (or form) at least a portion of the front surface 20A of the example electronic device 2. At least a portion of the front cover 21 may be substantially transparent. The front cover 21 may include, for example, a glass plate including various coating layers, or a polymer plate.

According to an embodiment, the case 22 may provide (or form) at least a portion of the rear surface 20B and the side surface 20C of the example electronic device 2. The case 22 may include a rear portion 221 and/or a side portion 222. The rear portion 221 of the case 22 may provide (or form) at least a portion of the rear surface 20B of the example electronic device 2. The side portion 222 of the case 22 may provide (or form) at least a portion of the side surface 20C of the example electronic device 2. In an embodiment, the case 22 may be substantially opaque. The side portion 222 of the case 22 may extend from, for example, the rear portion 221 of the case 22 to at least partially surround the space between the front cover 21 and the rear portion 221 of the case 22.

According to an embodiment, the case 22 may be provided (or formed) as an integrated or single structure (e.g., a single continuous structure or complete structure) including the rear portion 221 and the side portion 222. The case 22 may include, for example, a non-metal material. The case 22 may include, for example, a metal material. The case 22 may include, for example, a combination of at least one non-conductive portion (not separately illustrated) including a non-metal material and at least one conductive portion (not separately illustrated) including a metal material.

According to various embodiments, in place of the case 22, a rear surface plate (or rear surface cover) (not illustrated separately) and a side surface member (or a side surface bezel structure, a side wall, or a side) (not illustrated separately) may be provided. The rear surface plate may provide (or form) at least a portion of the rear surface 20B of the example electronic device 2. The rear surface plate may be made of, for example, coated or colored glass, ceramics, polymer, metal (e.g., aluminum, stainless steel (STS), or magnesium), or a combination of at least two of these materials. The side surface member may provide (or form) at least a portion of the side surface 20C of the example electronic device 2. The side surface member may include a metal and/or non-metal material.

According to an embodiment, the side portion 22 may include a first side portion 222 (or a first side wall, a first side wall part, a first bezel, or a first bezel part) 2221, a second side portion (or a second side wall, a second side wall part, a second bezel, or a second bezel part) 2222, a third side portion (or a third side wall, a third side wall part, a third bezel, or a third bezel part) 2223, and/or a fourth side portion (or a fourth side wall, a fourth side wall part, a fourth bezel, or a fourth bezel part) 2224.

According to an embodiment, when the front surface 20A of the example electronic device 2 is viewed from above (e.g., when viewed in the −z axis direction), the first side portion 2221 and the third side portion 2223 are spaced apart from each other and may be substantially parallel. The second side portion 2222 may interconnect one end of the first side portion 2221 and one end of the third side portion 2223. The fourth side portion 2222 may connect the other end of the first side portion 2221 and the other end of the third side portion 2223. When viewed from above the front surface 20A of the example electronic device 2, the second side portion 2222 and the fourth side portion 2224 are spaced apart from each other and may be substantially parallel. The first side portion 2221 may provide a first side surface corresponding to a first direction (e.g., the +x-axis direction) of the side surface 20C of the example electronic device 2. The second side portion 2222 may provide a second side surface corresponding to a second direction (e.g., the +y-axis direction) of the side surface 20C of the example electronic device 2. The third side portion 2223 may provide a third side surface corresponding to a third direction (e.g., the –x axis direction) of the side surface 20C of the example electronic device 2. The fourth side portion 2224 may provide a fourth side surface corresponding to the fourth direction (e.g., the –y axis direction) of the side surface 20C of the example electronic device 2.

According to an embodiment, the side portion 222 may include a first corner 2225 where the first side portion 2221 and the second side portion 2222 are connected to each other, a second corner 2226 where the second side portion 2222 and the third side portion 2223 are connected to each other, a third corner 2227 where the third side portion 2223 and the fourth side portion 2224 are connected to each other, and/or a fourth corner 2228 where the first side portion 2221 and the fourth side portion 2224 are connected to each other. The first corner 2225, the second corner 2226, the third corner 2227, and/or the fourth corner 2228 may be provided (or formed) in a smooth curved shape.

According to an embodiment, the example electronic device 2 may include a display module 230, a first camera module 241, a second camera module 242, a third camera module 243, a fourth camera module 244, a first light-emitting module 250, a second light-emitting module (not separately illustrated), a first sensor module 260, a second sensor module (not separately illustrated), a sound input module (not separately illustrated), a first sound output module (not separately illustrated), a second sound output module (not separately illustrated), a key input module, a first connection terminal 280, and/or a second connection terminal (not separately illustrated). Although not separately illustrated, at least one of the above-mentioned components may be omitted from the example electronic device 2, or other components may be additionally included.

According to various embodiments, the example electronic device 2 may include the example electronic device 101 of FIG. 1 or may include one or more components among a plurality of components included in the example electronic device 1.

According to an embodiment, the display area (or active area or screen area) of the display module 230 may be visible (or visually exposed) through the front cover 21 of the housing 20.

According to an embodiment, the example electronic device 2 may be implemented such that the display area of the display module 230 visible through the front cover 21 of the housing 20 appears as large as possible (e.g., a large screen or a full screen). For example, the display module 230 may be provided to have an outer periphery that is substantially the same as the outer peripheral shape of the front cover 21 of the housing 20.

According to an embodiment, although not separately illustrated, the first camera module 241, the second camera module 242, the third camera module 243, and/or the fourth camera module 244, may include one or more lenses, one or more image sensors, and/or an image signal processor (ISP).

According to an embodiment, the first camera module 241, the second camera module 242, and the third camera module 243 may be located to correspond to the rear surface

20B of the example electronic device 2. The first camera module 241, the second camera module 242, and the third camera module 243 may be understood as "rear camera modules".

According to an embodiment, the first camera module 241 may be located to correspond to a first camera hole provided (or formed) in the rear portion 221 of the case 22 or a first transparent portion (or a first transparent member or a first transparent body) located in the first camera hole and be visible from the outside of the example electronic device 2. The second camera module 242 may be located to correspond to a second camera hole provided (or formed) in the rear portion 221 of the case 22 or a second transparent portion (or a second transparent member or a second transparent body) located in the second camera hole and be visible from the outside of the example electronic device 2. The third camera module 243 may be located to correspond to a third camera hole provided (or formed) in the rear portion 221 of the case 22 or a third transparent portion (or a third transparent member or a third transparent body) located in the third camera hole and be visible from the outside of the example electronic device 2.

According to an embodiment, when viewed from above (e.g., when viewed in the +z-axis direction) of the rear surface 20B of the example electronic device 2, the first camera module 241, the second camera module 242, and the third camera module 243 may be arranged in a fourth direction (e.g., the –y-axis direction) from the second side portion 2222 toward the fourth side portion 2224. When viewed from above the rear surface 20B of the example electronic device 2, the first camera module 241 may be located to correspond to the first corner 2225 where the first side portion 2221 and the second side portion 2222 are connected to each other, and the second camera module 242 may be located between the first camera module 241 and the third camera module 243. In various embodiments, although not separately illustrated, the relative positions of the first camera module 241, the second camera module 242, and the third camera module 243 may vary without being limited to the illustrated example. Although not separately illustrated, the number of rear camera modules may vary without being limited to the illustrated example.

According to various embodiments, the first camera module 241, the second camera module 242, and/or the third camera module 243 may include a wide-angle camera module, a telephoto camera module, a color camera module, a monochrome camera, or an IR camera (e.g., a time-of-flight (TOF) camera or a structured light camera module).

According to an embodiment, the first camera module 241, the second camera module 242, and the third camera module 243 may have different properties (e.g., angles of view) or functions.

According to various embodiments, the first camera module 241, the second camera module 242, and/or the third camera module 243 may provide different angles of view (or lenses with different angles of view). The example electronic device 2 may selectively use the angle of view of the first camera module 241, the angle of view of the second camera module 242, and/or the angle of view of the third camera module 243 based on a user's selection regarding the angle of view.

According to an embodiment, the fourth camera module 244 may be located inside the example electronic device 2 or accommodated in the housing 20 to correspond to the front surface 20A of the example electronic device 2. External light may pass through the front cover 21 of the housing 20 and reach the fourth camera module 244. The fourth camera module 244 may be understood as a "front camera module".

According to an embodiment, the fourth camera module 244 may be located closer to the second side portion 2222 than the fourth side portion 2224 when viewed from above the front surface 20A of the example electronic device 2. The fourth camera module 244 may be located adjacent to, for example, the second side portion 2222. When viewed from above the front surface 20A of the example electronic device 2, the separation distance of the fourth camera module 244 from the first side portion 2221 and the separation distance of the fourth camera module 244 from the third side portion 2223 may be substantially the same.

According to various embodiments, the fourth camera module 244 may be located to be aligned with an opening provided in the display area of the display module 230 or may be at least partially inserted into the opening. External light may pass through the front cover 21 of the housing 20 and the opening in the display area to reach the fourth camera module 244. The opening in the display area aligned with or overlapping the fourth camera module 244 may be provided as a notch. In various embodiments, when viewed from above the front surface 20A of the example electronic device 2, the opening in the display area aligned with or overlapping the fourth camera module 244 may be provided (or formed) in the form of a hole (not separately illustrated).

According to various embodiments, although not separately illustrated, the fourth camera module 244 may overlap the display area of the display module 230 when viewed from above the front surface 20A of the example electronic device 2. The fourth camera module 244 may be located on the rear surface of the display area or below or beneath the display area. When viewed from the outside of the example electronic device 2, the fourth camera module 244 or the position of the fourth camera module 244 may not be substantially visually distinguished (or visible). The fourth camera module 244 may include, for example, a hidden behind-display camera (e.g., an under-display camera (UDC)). External light may pass through the front cover 21 of the housing 20 and the display area of the display module 230 to reach the fourth camera module 244.

According to various embodiments, although not separately illustrated, the fourth camera module 244 may be aligned with a recess provided on the rear surface of the display area of the display module 230, or may be at least partially inserted into the recess. When viewed from the outside of the example electronic device 2, the fourth camera module 244 or the position of the fourth camera module 244 may be substantially visually invisible or may not be visually distinguished.

According to various embodiments, although not separately illustrated, the portion of the display area of the display module 230 that at least partially overlaps the fourth camera module 244 may include a pixel structure and/or a wiring structure that is different from other areas. The pixel structure and/or the wiring structure provided in the portion of the display area that at least partially overlaps the fourth camera module 244 may be implemented to reduce light loss between the outside of the example electronic device 2 and the fourth camera module 244. The portion of the display area that at least partially overlaps the fourth camera module 244 may have, for example, a pixel density (e.g., the number of pixels per unit area) that is different from other areas. For example, the portion of the display area that at least partially overlaps the fourth camera module 244 may not substantially include a plurality of pixels.

According to an embodiment, the first light-emitting module 250 may be located to correspond to the rear surface 20B of the example electronic device 1. The first light-emitting module 250 may include a light source for the first camera module 241, the second camera module 242, and/or the third camera module 243. The first light-emitting module 250 may include, but is not limited to, an LED, an IR LED, or a xenon lamp.

According to an embodiment, the first light-emitting module 250 may be located to correspond to a flash hole provided (or formed) in the rear portion 221 of the case 22 or a fourth transparent portion (or a fourth transparent member or transparent body) disposed in the flash hole.

According to an embodiment, the second light-emitting module (e.g., LED, IR LED, or xenon lamp) (not separately illustrated) may be located inside the example electronic device 2 or accommodated in the housing 20 to correspond to the front surface 20A of the example electronic device 2. The second light-emitting module may provide status information of the example electronic device 2 in the form of light. In various embodiments, the second light-emitting module may provide a light source that operates in conjunction with the operation of the first camera module 244.

According to an embodiment, the first sensor module 260 may be located inside the example electronic device 2 or accommodated in the housing 20 to correspond to the front surface 20A of the example electronic device 2. The first sensor module 260 may include, for example, an optical sensor (e.g., a proximity sensor or an illuminance sensor). Although not separately illustrated, the location of the first sensor module 260 may vary without being limited to the illustrated example.

According to an embodiment, the first sensor module 260 may be located to be aligned with an opening provided in the display area of the display module 230 or may be at least partially inserted into the opening. External light may pass through the front cover 21 of the housing 20 and the opening in the display area of the display module 230 to reach the first sensor module 260. The opening in the display area aligned with or overlapping the first sensor module 260 may be provided in the form of a hole. In various embodiments, when viewed from above the front surface 20A of the example electronic device 2, the opening in the display area aligned with or overlapping the first sensor module 260 may be provided as a notch (not separately illustrated).

According to various embodiments, although not separately illustrated, the first sensor module 260 may overlap the display area of the display module 230 when viewed from above the front surface 20A of the example electronic device 2. The first sensor module 260 may be located on the rear surface of the display area or below or beneath the display area. When viewed from the outside of the example electronic device 2, the first sensor module 260 or the position of the first sensor module 260 may be substantially visually invisible or may not be visually distinguished. External light may pass through the front cover 21 of the housing 20 and the display area of the display module 230 to reach the first sensor module 260.

According to various embodiments, although not separately illustrated, the first sensor module 260 may be aligned with a recess provided on the rear surface of the display area of the display module 230, or may be at least partially inserted into the recess. When viewed from the outside of the example electronic device 2, the first sensor module 260 or the position of the first sensor module 260 may be substantially visually invisible or may not be visually distinguished.

According to various embodiments, although not separately illustrated, the portion of the display area of the display module 230 that at least partially overlaps the first sensor module 260 may include a pixel structure and/or a wiring structure that is different from other areas. The pixel structure and/or the wiring structure provided in the portion of the display area that at least partially overlaps the first sensor module 260 may be implemented to reduce light loss between the outside of the example electronic device 2 and the first sensor module 260. For example, the portion of the display area that at least partially overlaps the first sensor module 260 may have a pixel density (e.g., the number of pixels per unit area) that is different from other partial areas. For example, the portion of the display area that at least partially overlaps the first sensor module 260 may not substantially include a plurality of pixels.

According to various embodiments, the second sensor module (not separately illustrated) may include an optical, electrostatic, or ultrasonic biometric sensor (e.g., a fingerprint sensor). The second sensor module may be located inside the example electronic device 2 or accommodated in the housing 20, for example, in a manner that is at least partially the same or similar to the first sensor module 260. Although not separately illustrated, the example electronic device 2 may further include one or more other sensor modules provided at various other positions.

According to an embodiment, a sound input module (not separately illustrated) may include a microphone. The microphone may be located inside the example electronic device 2 or accommodated in the housing 20 to correspond to, for example, the microphone hole MH provided in the fourth side portion 2224. Although not separately illustrated, the positions or numbers of microphones and microphone holes corresponding to the microphones may vary without being limited to the illustrated example.

According to an embodiment, the first sound output module (not separately illustrated) may include a first speaker used to reproduce data related to multimedia or recording. The first speaker may be located inside the example electronic device 2 or accommodated in the housing 20 to correspond to, for example, a first speaker hole SH1 provided in the fourth side portion 2224. In various embodiments, the first speaker may include a piezo speaker, and the first speaker hole SH1 may be omitted. Although not separately illustrated, the positions or number of first sound output modules including the first speaker may vary.

According to an embodiment, the second sound output module (not separately illustrated) may include a second speaker used for a call (e.g., a call receiver). The second speaker may be located inside the example electronic device 2 or accommodated in the housing 20 to correspond to, for example, a second speaker hole SH2 (e.g., a through hole or a notch-type opening) provided in the front cover 21 or the second side portion 2222 between the front cover 21 and the second side portion 2222 of the housing 20. In various embodiments, the second speaker may include a piezo speaker, and the second speaker hole SH2 may be omitted. Although not separately illustrated, the positions or number of second sound output modules including the first speaker may vary.

According to various embodiments, a single hole (not separately illustrated) may be provided (or formed) to replace the microphone hole MH and the first speaker hole SH1.

According to an embodiment, the key input module may include a first key 271 located in the first key hole of the first side portion 2221, a second key 272 located in the second key hole of the first side portion 2222, and/or a key signal generator (not separately illustrated) configured to generate a key signal in response to pressing or touching the first key 271 and/or the second key 272. Although not separately illustrated, the positions or number of key input modules may vary without being limited to the illustrated example.

According to an embodiment, the first connection terminal (e.g., the first connector) 280 may be located inside the example electronic device 2 or accommodated in the housing 20 to correspond to a first connection terminal hole (e.g., the first connector hole) provided in the fourth side portion 2224. An external electronic device may be electrically connected to the example electronic device 2 via the first connection terminal 280. The example electronic device 2 may receive or transmit power and/or data from or to an external electronic device via the first connection terminal 280. The first connection terminal 280 may include, for example, a USB connector or an HDMI connector. Although not separately illustrated, the positions or number of first connection terminals 280 may vary without being limited to the illustrated example.

According to an embodiment, the second connection terminal (e.g., the second connector) may be located inside the example electronic device 2 or accommodated in the housing 20 to correspond to a second connection terminal hole (e.g., the first connector hole) provided in the third side portion 2223. The cover member 290 may be located in the second connector hole to cover the second connection terminal. An external storage medium such as a SIM card (or a universal SIM (USIM) card) or a memory card (e.g., a secure digital (SD) memory card) may be connected to the second connection terminal. Although not separately illustrated, the positions or number of second connection terminals may vary without being limited to the illustrated example.

The example electronic device 2 may further include various components depending on the form in which it is provided. Although all of these components cannot be listed since the components are modified diversely depending on the convergence trend of example electronic devices 2, components equivalent to the above-mentioned components may be further included in the example electronic device 2. In various embodiments, specific components may be excluded from the above components or replaced with other components depending on the provided form of the example electronic device.

Figure 3:
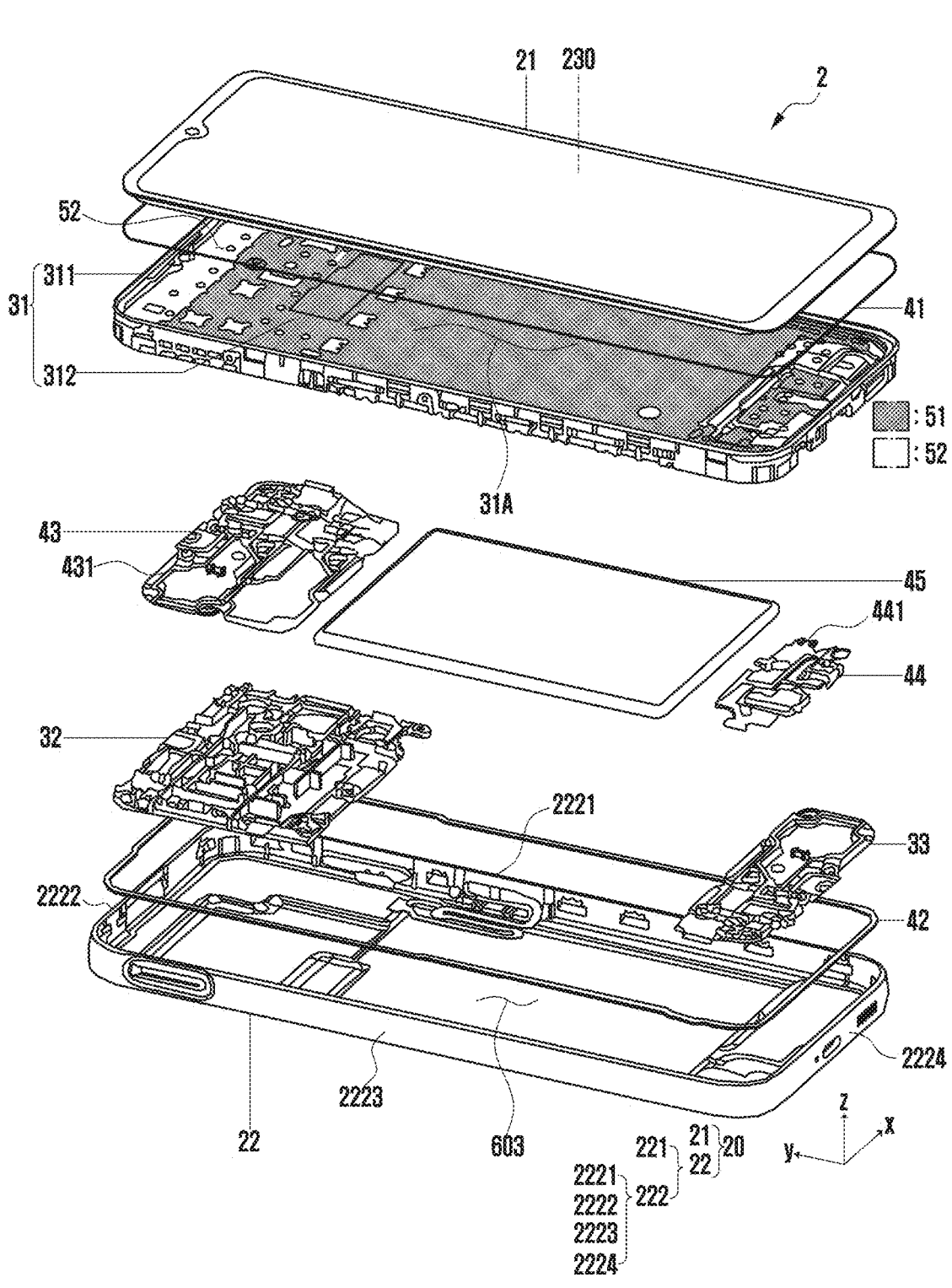
FIGS. 3 and 4 are exploded perspective views of the electronic device according to various embodiments.
Figure 4:
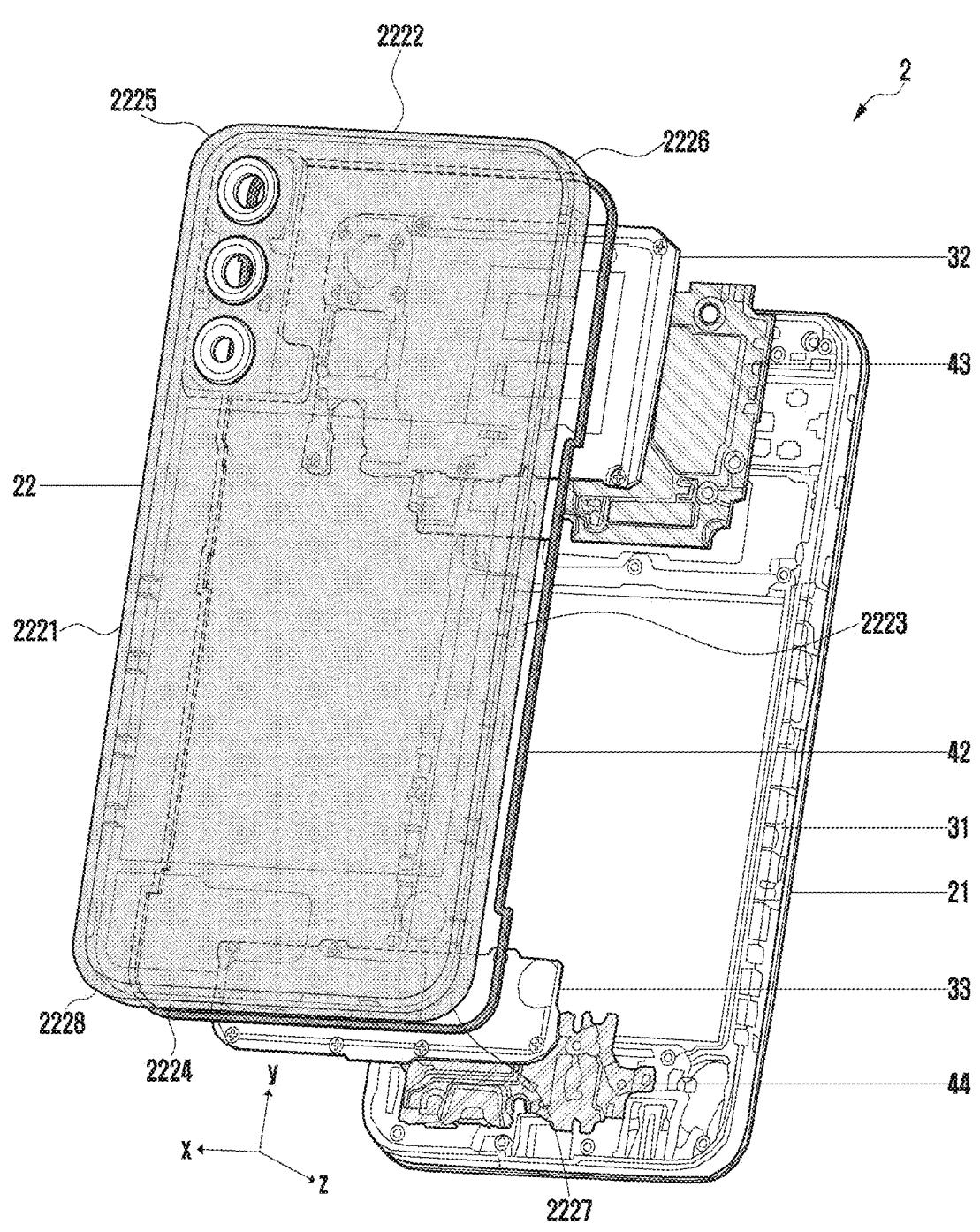
Figure 5:
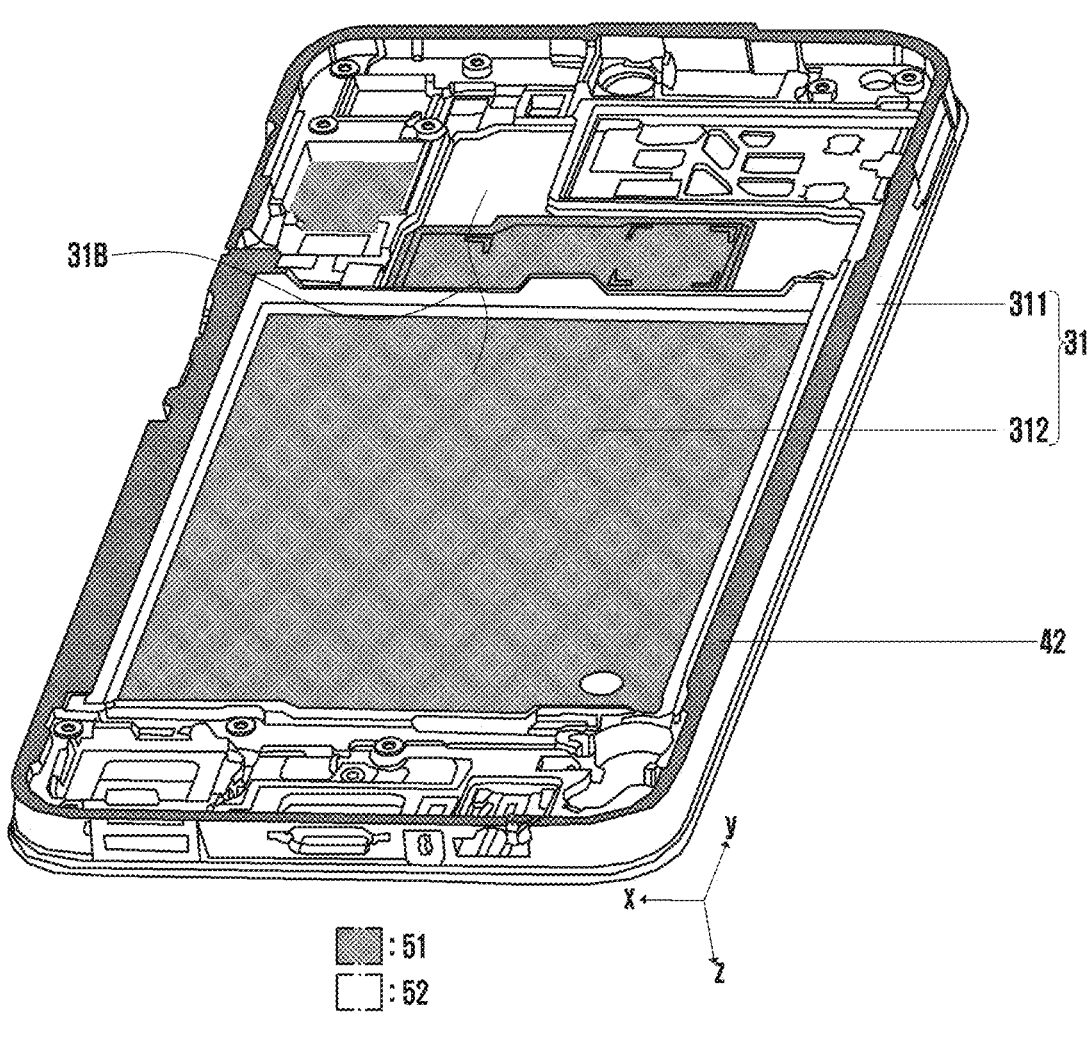
FIG. 5 is a perspective view of a combination of a first support and a seal member according to various embodiments.
Figure 6:
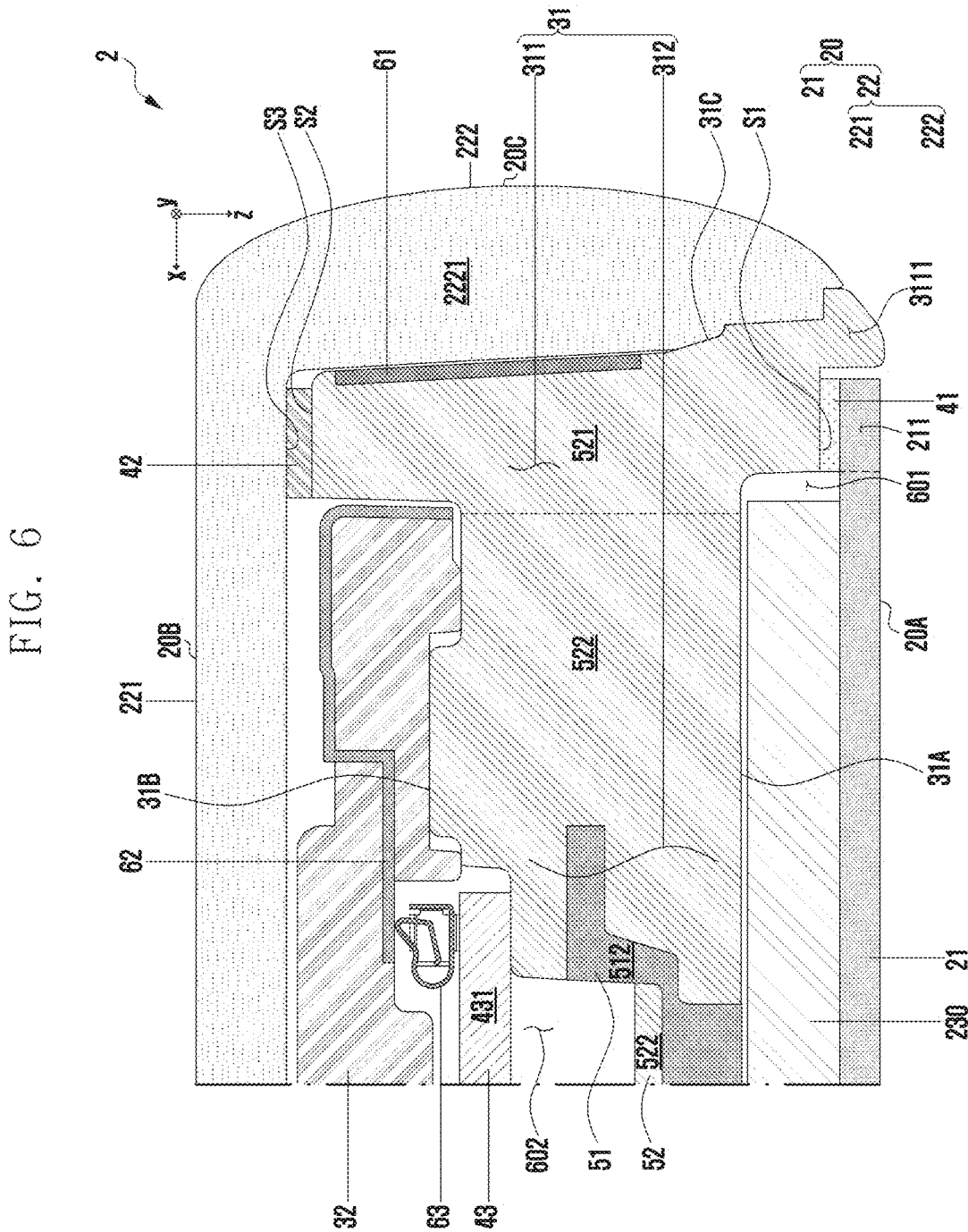
FIG. 6 is a cross-sectional view of a portion of the example electronic device 2 taken along line A-A' of FIG. 2 according to various embodiments.

FIGS. 3 and 4 are exploded perspective views of an example electronic device 2 according to various embodiments. FIG. 5 is a perspective view of a combination of a first support 31 and a seal member 42 according to various embodiments. FIG. 6 is a cross-sectional view of a portion of an example electronic device 2 taken along line A-A' of FIG. 2 according to various embodiments. It may be understood that the disclosure includes all of the combinations of features and/or embodiments disclosed with reference to FIGS. 3, 4, 5, and 6. That is, all of the combinations of features described below with reference to FIGS. 3, 4, 5, and 6 are to be considered as being included in the disclosure as specific examples.

Referring to FIGS. 3, 4, 5, and 6, the example electronic device 2 may include a housing 20, a first support 31, a second support 32, a third support 33, a sticking member 41, a seal member (e.g., including a seal) 42, a display module 230, a first board assembly 43, a second board assembly 44, a battery 45, a first conductive pattern 61, a second conductive pattern 62, and/or a first flexible conductor 63. Although not separately illustrated, at least some of the above-mentioned components may be omitted from the example electronic device 2 or other components may be additionally included in the example electronic device 2.

According to an embodiment, the housing 20 may include a front cover 21 and a case 22. The front cover 21 may provide (or form) at least a portion of the front surface 20A of the example electronic device 2. The case 22 may a rear portion 221 that defines (or provides) at least a portion of the rear surface 20B of the example electronic device 2 and a side portion 222 that defines (or provides) at least a portion of the side surface 20C of the example electronic device 2. The case 22 may be provided (or formed) as an integrated or single structure including, for example, a rear portion 221 and a side portion 222.

According to an embodiment, the case 22 may have a third recess 603 by combining the rear portion 221 and the side portion 222.

According to an embodiment, the first support (also referred to as a first support, a first support member, a first support structure, or a bracket) 31 may be located between the front cover 21 and the case 22. The first support 31 may be located in the third recess 603 of the case 22.

According to an embodiment, the first support 31 may include a first portion 311 and a second portion 312 connected to the first portion 311 or extending from the first portion 311. The first portion 311 may be connected to the side portion 222 of the case 22. The first portion 311 may be arranged (or extended) in a loop shape along the side portion 222 of the case 22. The second portion 312 may be located inside the first portion 311 when viewed from above the front surface 20A or the rear surface 20B of the example electronic device 2. When viewed from above the front surface 20A or the rear surface 20B of the example electronic device 2, the second portion 312 may be laterally surrounded by the first portion 311.

According to an embodiment, the second portion 312 of the first support 31 may be provided (or formed) in the form of a plate (e.g., a mounting plate) disposed between the front cover 21 and the rear portion 221 of the case 22. The first portion 311 of the first support 31 may extend along the edge of the plate-shaped second portion 312.

According to an embodiment, the combination of the case 22 and the first support 31 may be understood as structural elements in which electrical components (or functional components) such as a display module 230, a first board assembly 43, a second board assembly 44, or a battery 45, and/or mechanical elements such as a second support 32 and a third support 33 are arranged and/or supported. The combination of the case 22 and the first support 31 may be referred to, for example, as a "frame", a "frame structure", or a "framework". For example, the case 22 may be referred to as a "first frame (or a first frame structure or a first framework)", and the first support 31 may be referred to as a "second frame (or a second frame structure or a second framework)".

According to various embodiments, the first support 31 may be understood as a part of the housing 20.

According to an embodiment, the first portion 311 of the first support 31 may be provided (or formed) to be higher than the second portion 312 of the first support 31 in the direction in which the front surface 20A of the example electronic device 2 is oriented (e.g., the +z-axis direction). Due to the shape of the first portion 311 protruding more than the second portion 312 in the direction in which the front surface 20A of the example electronic device 2 is oriented, the first support 31 may have a first recess 601 (see FIG. 6) corresponding to the front surface 20A side of the example electronic device 601 (see FIG. 6). One or more components, such as the front cover 21 and the display module 230, may be located in the first recess 601 and may be disposed on or supported by the first support 31.

According to an embodiment, the first portion 311 of the first support 31 may be provided (or formed) to be higher than the second portion 312 of the first support 31 in the direction in which the rear surface 20B of the example electronic device 2 is oriented (e.g., the −z-axis direction). Due to the shape of the first portion 311 protruding more than the second portion 312 in the direction in which the second surface 20B of the example electronic device 2 is oriented, the first support 31 may have a second recess 602 (see FIG. 6) corresponding to the rear surface 20B side of the example electronic device 601 (see FIG. 6). A plurality of components such as one or more rear camera modules (e.g., the first camera module 241, the second camera module 242, and/or the third camera module 243 in FIG. 2), the second support 32, the third support 33, the first board assembly 43, the second board assembly 44, and/or the battery 45 may be located in the second recess 602 and disposed on or supported by the first support 31.

According to an embodiment, making the first portion 311 of the first support 31 protrude more than the second portion 312 in the direction in which the front surface 20A and/or the rear surface 20B of the example electronic device 2 is oriented may contribute to reducing the thickness of the second portion 312 (e.g., the thickness in the direction in which the front surface 20A or the rear surface 20B of the example electronic device 2 is oriented) for example, for the purpose of slimming the example electronic device 2 while securing or improving the rigidity (e.g., torsional rigidity) of the first support 31.

According to an embodiment, the first portion 311 of the first support 31 may protrude more than the second portion 312 of the first support 31 in the direction in which the rear surface 20B of the example electronic device 2 is oriented, compared to the direction in which the front surface 20A of the example electronic device 2 is oriented. For example, the first portion 311 may protrude to a first height with respect to the second portion 312 in the direction in which the rear surface 20B of the example electronic device 2 is oriented, and may protrude to a second height lower than the first height with respect to the second portion 312 in the direction in which the front surface 20A of the example electronic device 2 is oriented. At least a portion of the second portion 312 included in the first support 31 may be located closer to the rear surface cover 21 than the rear portion 221 of the case 22 in a direction parallel to the direction in which the front surface 20A or the rear surface 20B of the example electronic device 2 is oriented. In a direction parallel to the direction in which the front surface 20A or the rear surface back 20B of the example electronic device 2 is oriented, at least a portion of the second recess 602 may be provided (or formed) deeper than the first recess 601.

According to an embodiment, the first portion 311 of the first support 31 may include a border area (also referred to as a border portion) 3111 disposed between the front cover 21 and the side portion 222 of the case 22. For example, the border area 3111 may extend in a loop shape.

According to an embodiment, the first support 31 may include a first support surface 31A, a second support surface 31B, and/or a third support surface 31C. The first support surface 31A may be located to correspond to the front surface 20A side of the example electronic device 2. The second support surface 31B may be located to correspond to the rear surface 20B side of the example electronic device 2.

For example, the third support surface 31C may be configured to face the side portion 222 of the case 22 and be coupled to the side portion 222.

According to an embodiment, the first support surface 31A of the first support 31 may provide a front seating portion on which one or more components such as the front cover 21 and the display module 230 are stably disposed or supported. The front seating portion may be provided with a combination of surface areas of different heights. The front seating portion may include, for example, the first recess 601.

According to an embodiment, the first support surface 31A of the first support 31 may include a first surface S1 (see FIG. 6). The first surface S1 may be oriented substantially in the direction in which the front surface 20A of the example electronic device 2 is oriented. The first surface S1 may face the front cover 21. When viewed from above the front surface 20A of the example electronic device 2, the border 211 of the front cover 21 may overlap the first surface S1 of the first support 31. The sticking member containing a sticking material (or an adhesive member containing an adhesive material) 41 (e.g., double-sided tape) may be disposed between the first surface S1 of the first support 31 and the border 211 of the front cover 21. The front cover 21 may be coupled to the first surface S1 of the first support 31 via an adhesive member 41.

According to an embodiment, the first surface S1 may be included in the first portion 311. The first surface S1 may be understood as a "bonding area" configured to couple the first portion 311 and the front cover 21 via the sticking member 41. For example, the first surface S1 and the sticking member 41 may extend in a loop shape along the border 211 of the front cover 21. The display module 230 may be located between the front cover 21 and the first support 31. The display module 230 may be bonded to an area inside the border 211 of the front cover 21. The display module 230 may be coupled to the front cover 21 via, for example, an optically transparent sticking material (or an optically transparent adhesive material) disposed between the front cover 21 and the display module 230 (e.g., an optical clear adhesive (OCA), an optical clear resin (OCR) or a super view resin (SVR)).

According to an embodiment, the sticking member 41 may suppress or prevent external foreign substances such as moisture and/or dust from flowing into a space between the front cover 21 and the first support 31 through a gap between the front cover 21 and the first support 31. The sticking member 41 may be understood as a "seal member", a "seal part", a "waterproof member", or a "waterproof part". The combination of the sticking member 41, the area of the front cover 21 where the sticking member 41 is disposed (e.g., the border 211), and the first surface S1 of the first support 31 where the sticking member 41 is disposed may be understood as a "first sealing area" or a "first waterproofing area" of the example electronic device 2.

According to an embodiment, the second support surface 31B of the first support 31 may provide a rear surface seating portion where a plurality of components such as one or more rear camera modules (e.g., the first camera module 241 in FIG. 2, the second camera module 242, and/or the third camera module 243), the second support 32, the third support 33, the first board assembly 43, the second board assembly 44, and/or the battery 45 are disposed or supported. The rear seating portion may be provided with a combination of surface areas having different heights. The rear seating portion may include, for example, a second recess 602 (see FIG. 6).

According to an embodiment, the second support surface 31B of the first support 31 may include a second surface S2. The second surface S2 may be oriented substantially in the direction in which the rear surface 20B of the example electronic device 2 is oriented. The second surface S2 may face the rear portion 221 of the case 22. The first support 31 may be configured to be in direct or indirect contact with the rear portion 221 of the case 22 via the second surface S2.

According to an embodiment, the "direct contact" between the second surface S2 of the first support 31 and the rear portion 221 of the case 22 may be understood as the second surface S2 being in physical contact with the rear portion 221 without a medium (or an intermediate member) between the second surface S2 and the rear portion 221.

According to an embodiment, the "indirect or mediate contact" between the second surface S2 of the first support 31 and the rear portion 221 of the case 22 may be understood as the second surface S2 being in contact with the rear portion 221 via (or with) at least one medium (or an intermediate member) between the second surface S2 and the rear portion 221.

According to an embodiment, the second surface S2 may be included in the first portion 311. The second surface S2 may be provided in a loop shape along the side portion 222 of the case 22. When viewed from above the rear surface 20B of the example electronic device 2, the rear portion 221 of the case 22 may include a third surface S3 that overlaps the second surface S2 of the first support 31. For example, the third surface S3 may extend in a loop shape adjacent to the boundary between the rear portion 221 and the side portion 222 of the case 22. The second surface S2 of the first support 31 may be in direct or indirect contact the third surface S3 of the case 22.

According to an embodiment, the direct or indirect contact between the second surface S2 of the first support 31 and the third surface S3 of the case 22 may suppress or prevent or block external foreign substances such as moisture and/or dust from flowing into a space between the first support 21 and the rear portion 221 of the case 31 through a gap between the first support 21 and the first support 31. External foreign substances may flow into a gap between the side portion 222 of the case 22 and the first portion 311 of the first support 31, but the direct contact or indirect contact between the second surface S2 of the first support 31 and the third surface S3 of the case 22 may suppress or prevent external foreign substances from moving into a space between the first support 31 and the rear portion 221 of the case 22. The direct or indirect contact area between the second surface S2 of the first support 31 and the second surface S3 of the case 22 may be understood as a "second sealing area" or a "second waterproofing area" of the example electronic device 2.

According to an embodiment, with respect to the indirect contact between the second surface S2 of the first support 31 and the third surface S3 of the case 22, the seal member 42 may be disposed between the second surface S2 and the third surface S3. The seal member 42 may extend in a loop shape along the second surface S2 and the third surface S3.

According to an embodiment, the seal member 42 may be disposed on (or coupled to) the second surface S2 of the first support 31 or the third surface S3 of the case 22 via a sticking material (or an adhesive material) (e.g., double-sided tape) (not separately illustrated).

According to an embodiment, the seal member 42 may include an elastic member or a flexible member. The seal member 42 may include a seal including, for example, a sponge or rubber, but is not limited thereto. The seal member 42 may be pressed between the second surface S2 of the first support 31 and the third surface S3 of the case 22. The seal member 42 may be made of various materials capable of substantially blocking the movement of moisture and/or dust between the second surface S2 of the first support 31 and the third surface S3 of the case 22.

According to an embodiment, when the seal member 42 includes a sticking material (or an adhesive material) such as double-sided tape, the second surface S2 of the first support 31 and the third surface S3 of the case 22 may be coupled or bonded via the seal member 42. Indirect contact between the second surface S2 of the first support 31 and the third surface S3 of the case 22 via the seal member 42 made of a sticking material may be understood as being a "connection" between the first support 31 and the case 22 via the seal member 42.

According to an embodiment, the seal member 42 may reduce or prevent fluid flow from a first area (a first space or first space area) between the first portion 311 of the first support 31 and the side portion 222 of the case 22 to a second area (a second space or second space area) between the second portion 312 of the first support 31 and the rear portion 221 of the case 22. The first conductive pattern 61 may be located in the first area, and the second conductive pattern 62 may be located in the second area. The seal member 42 may reduce or prevent fluid flow from the first area where the first conductive pattern 61 is disposed to the second area where the second conductive pattern 62 is disposed.

According to an embodiment, when the first portion 311 of the first support 31 protrudes in the direction in which the rear surface 20B of the example electronic device 2 is oriented with respect to the second portion 312 of the first support 31 such that the first portion 311 comes into direct or indirect contact with the rear portion 221 of the case 22 via the second surface S2, the example electronic device 2 is able to have desired waterproofing and/or dustproofing performance (e.g., an IP44 rating or higher). The first portion 311 of the first support 31 may be defined or understood as a component configured to protrude toward the rear portion 221 of the case 22 with reference to the second portion 312 of the first support 31 for waterproofing and/or dustproofing between the first portion 311 and the rear portion 221 of the case 22.

According to an embodiment, the first height to which the first portion 311 of the first support 31 protrudes with respect to the second portion 312 in the direction in which the rear surface 20B of the example electronic device 2 is oriented may be configured to enable stable interposition of the seal member 42 while reducing the gap between the first portion 311 and the rear portion 221 of the case 22.

According to various embodiments, although not separately illustrated, direct contact or indirect contact for waterproofing and/or dustproofing between the first portion 311 of the first support 31 and the rear portion 221 of the case 22 is not limited to the given example and may be extended to the first portion 311 of the first support 31 and the side portion 222 of the case 22.

According to an embodiment, the first portion 311 of the first support 31 may be coupled to the side portion 222 of the case 22 through mechanical fastening. When the first support 31 is inserted into the third recess 603 in the case 22 at the time coupling the first support 31 and the case 22, the first portion 311 of the first support 31 may be coupled to the side portion 222 through mechanical fastening between the first portion 311 and the side portion 222 of the case 22.

According to an embodiment, the first portion 311 of the first support 31 and the side portion 222 of the case 22 may be detachably coupled.

According to an embodiment, the first portion 311 of the first support 31 may include a plurality of first fastening elements (not separately illustrated) disposed or provided on the third support surface 31C. The side portion 222 of the case 22 may include a plurality of second fastening elements (not separately illustrated) corresponding to the plurality of first fastening elements. When the first support 31 is inserted into the third recess 603 in the case 22 at the time of coupling the first support 31 and the case 22, the first portion 311 of the first support 31 and the side portion 222 of the case 22 may be coupled through the fastening between the first fastening elements and the plurality of second fastening elements.

According to an embodiment, although not separately illustrated, the plurality of first fastening elements included in the first portion 311 of the first support 31 and the plurality of second fastening elements included in the side portion 222 of the case 22 may be coupled through sliding fastening. For sliding fastening, for example, the plurality of first fastening elements include sliders (or fitting protrusions), and the plurality of second fastening elements include grooves (or recesses) into which the sliders can be inserted and fitted. For sliding fastening, for example, the plurality of second fastening elements include sliders, and the plurality of first fastening elements include grooves (or recesses) into which the sliders can be inserted and fitted.

According to an embodiment, although not separately illustrated, the plurality of first fastening elements included in the first portion 311 of the first support 31 and the plurality of second fastening elements included in the side portion 222 of the case 22 may be coupled through snap-fit fastening. The snap-fit fastening may be an assembly method in which interlocking elements of the first portion 311 of the first support 31 and the side portion 222 of the case 22 are elastically pushed to be coupled to each other. For the snap-fit fastening, for example, the plurality of first fastening elements may include hooks, and the plurality of second fastening elements may include hook fastening portions (engagement portions) corresponding to the hooks. For the snap-fit fastening, for example, the plurality of second fastening elements may include hooks, and the plurality of first fastening elements may include hook fastening portions (engagement portions) corresponding to the hooks.

Although not separately illustrated, the first portion 311 of the first support 31 and the side portion 222 of the case 22 may be coupled through various other methods.

According to an embodiment, the width of the gap between the second surface S2 of the first support 31 and the third surface S3 of the case 22 may be determined by the coupling between the first portion 311 of the first support 31 and the side portion 222 of the case 22. The width of the gap between the second surface S2 of the first support 31 and the third surface S3 of the case 22 may be determined to enable stable interposition of the seal member 42.

According to an embodiment, the first support 31 may include metal 51 and/or non-metal 52. For example, the first support 31 including the first portion 311 and the second portion 312 may be provided (or formed) by a combination of the metal 51 and the non-metal 52. The metal 51 may include, for example, a combination of one or more conductive portions (or metal parts). The non-metal 52 may include, for example, a combination of one or more non-conductive portions (or metal parts).

According to an embodiment, the metal 51 may include at least one first metal area (not separately illustrated) included in the first portion 311 of the first support 31 and a second metal area 512 of the second portion 312 of the first support 31.

According to an embodiment, the at least one first metal area (not separately illustrated) of the metal 51 may extend from the second metal area 512 or be connected to the second metal area 512 of the metal 51.

According to an embodiment, the at least one first metal area (not separately illustrated) of the metal 51 may be bent and extend from the second metal area 512 of the metal 51. The at least one first metal area (not separately illustrated) may extend, for example, while being bent from the second metal area 512 of the metal 51 toward the rear portion 221 of the case 22. The at least one first metal area (not separately illustrated) may extend, for example, while being bent from the second metal area 512 toward the front cover 21.

According to an embodiment, the metal 51 may be provided (or formed) as an integrated or single metal structure (e.g., a single continuous structure or a complete structure) including at least one first metal area (not separately illustrated) and a second metal area 512. The at least one first metal area (not separately illustrated) and the second metal area 512 may include the same metal material. The metal 51 may include, for example, aluminum (Al), but is not limited thereto.

According to an embodiment, the at least one first metal area (not separately illustrated) and the second metal area 512 of the metal 51 may be separated from each other at least in part.

According to various embodiments, the at least one first metal area (not separately illustrated) of the metal 51 may be omitted.

According to an embodiment, the non-metal 52 may include at least one first non-metal area 521 (not separately illustrated) included in the first portion 311 of the first support 31 and a second non-metal area 522 of the second portion 312 of the first support 31.

According to an embodiment, the non-metal 52 may be provided (or formed) as an integrated or single non-metal structure (e.g., a single continuous structure or a complete structure) including a first non-metal area 521 and a second non-metal area 522. The first non-metal area 521 and the second non-metal area 522 may include the same non-metal material (e.g., polymer).

According to an embodiment, the first support surface 31A and/or the second support surface 31B of the first support 31 may be provided (or formed) through a combination of the conductive surface (or metal surface) of the metal 51 and/or the non-conductive surface (or non-metal surface) of the non-metal 52.

According to an embodiment, the third support surface 31C of the first support 31 may be provided (or formed) through a combination of the conductive surface (or metal surface) of the metal 51 and/or the non-conductive surface (or non-metal surface) of the non-metal 52.

According to an embodiment, the metal 51 of the first support 31 may be manufactured through pressing.

According to an embodiment, the non-metal 52 of the first support 31 may be manufactured through injection molding (e.g., insert injection molding). For example, the non-metal 52 coupled with the metal 51 may be formed by injecting molten resin into a mold in which the metal 51 is placed and then cooling the molten resin.

According to an embodiment, the first support 31 may be practically completed through shape machining (e.g., computer numerical control (CNC) machining) and/or surface processing (e.g., coating and/or painting) performed on a primary molded product manufactured after pressing and injection molding. The first support 31 may be manufactured through various other methods.

According to an embodiment, the first surface S1, the second surface S2, and/or the third support surface 31C of the first support 31 may be provided (or formed) by the first non-metal area 521 of the non-metal included in the first portion 311. The first surface S1, the second surface S2, and/or the third support surface 31C may be a non-conductive surface provided (or formed) by the first non-metal area 521.

According to various embodiments, although not separately illustrated, the first surface S1, the second surface S2, and/or the third support surface 31C of the first support 31 may be provided (or formed) by a combination of the at least one first metal area of the metal 51 included in the first portion 311 and the first non-metal area 521 of the non-metal 52 included in the first non-metal area 521.

According to an embodiment, a second support (also referred to as a second support, a second support member, or a second support structure) 32 and a third support (also referred to as a third support, a third support member, or a third support structure) 33 may be located between the second portion 312 of the first support 31 and the rear portion 221 of the case 22. For example, the second support 32 and/or the third support 33 may be disposed on or coupled to the second portion 312 of the first support 31.

According to an embodiment, the second support 32 and/or the third support 33 may be made of a non-metal material or may include a non-conductive portion. The second support 32 and/or the third support 33 may be provided (or formed) as, for example, a non-conductive support or a non-metal support.

According to an embodiment, the second support 32 and/or the third support 33 may be coupled to the second portion 312 of the first support 31 through mechanical fastening, such as screw fastening.

According to an embodiment, when viewed from above the rear surface 20B of the example electronic device 2, the second support 32 and the third support 33 may be located to be at least partially spaced apart from each other with the battery 45 interposed therebetween. When viewed from above the rear surface 20B of the example electronic device 2, the second support 32 may be located closer to the second side portion 2222 of the case 22 than the third support 33, and the third support 33 may be located closer to the fourth side portion 2224 of the case 22 than the second support 32.

According to various embodiments, the first support 31 or the second portion 312 of the first support 31 may be understood as including the second support 32 and/or the third support 33.

According to an embodiment, the first board assembly 43, the second board assembly 44, and/or the battery 45 may be located between the second portion 312 of the first support 31 and the rear portion 221 of the case 22. The first board assembly 43, the second board assembly 44, and/or the battery 45 may be disposed (or coupled) on the second portion 312 of the first support 31.

According to an embodiment, when viewed from above the rear surface 20B of the example electronic device 2, the first board assembly 43 and the second board assembly 44 are located to be spaced apart from each other with the battery 45 interposed therebetween.

According to an embodiment, when viewed from above on the rear surface 20B of the example electronic device 2, the first board assembly 43 may be at least partially located between the battery 38 and the second side portion 2222 of the case 22. When viewed from above on the rear surface 20B of the example electronic device 2, the second board assembly 44 may be at least partially located between the battery 38 and the fourth side portion 2224 of the case 22.

According to an embodiment, the first board assembly 43 may be at least partially located between the first support 31 and the second support 32. The second support 32 may be at least partially located between the first board assembly 43 and the rear portion 221 of the case 22. The second support 32 may cover and/or protect the first board assembly 43.

According to an embodiment, the second board assembly 44 may be at least partially located between the first support 31 and the third support 33. The third support 33 may be at least partially located between the second board assembly 44 and the rear portion 221 of the case 22. The third support 33 may cover and/or protect the second board assembly 44.

According to an embodiment, the first board assembly 43 may include a first printed circuit board 431, electrical elements (not illustrated separately) disposed on or connected to the first printed circuit board 431, and/or mechanical elements (or structural elements) (not separately illustrated) disposed on or connected to the first printed circuit board 431.

According to an embodiment, the second board assembly 44 may include a second printed circuit board 441, electrical elements (not illustrated separately) disposed on or connected to the second printed circuit board 441, and/or mechanical elements (or structural elements) (not separately illustrated) disposed on or connected to the second printed circuit board 441.

Figure 7:
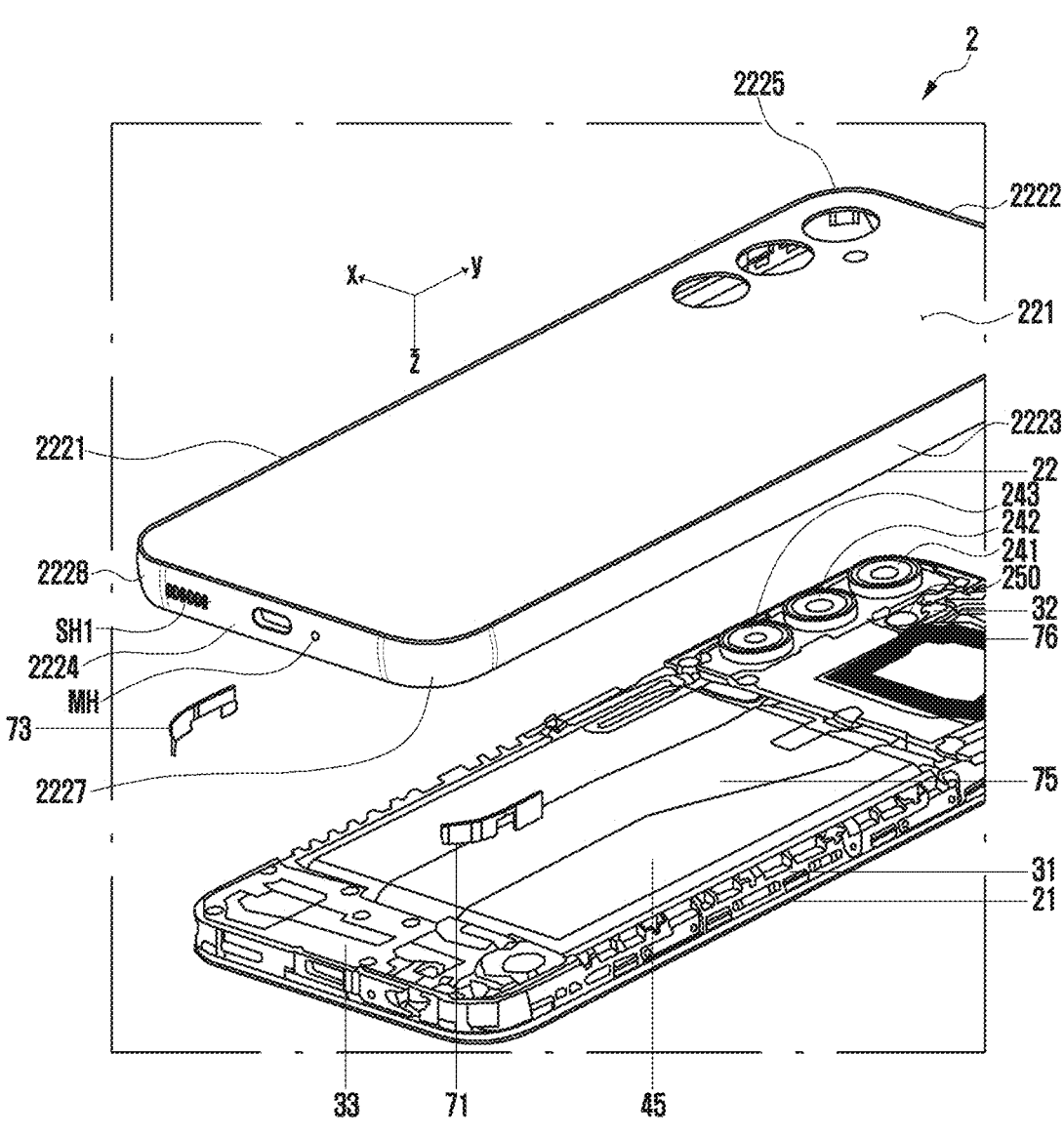
FIG. 7 is an exploded perspective view of the example electronic device according to various embodiments.

According to an embodiment, the first board assembly 43 and the second board assembly 44 may be electrically connected to each other via an electrical connection member (e.g., the flexible printed circuit board 75 in FIG. 7). The electrical connection member may be disposed across, for example, the battery 45.

According to various embodiments, although not separately illustrated, the first printed circuit board 431 of the first board assembly 43 may include a protrusion (not separately illustrated) extending between the battery 45 and the first side portion 2221 of the case 22 or between the battery 45 and the third side portion 2223 of the case 22 when viewed from above the rear surface 20B of the example electronic device 2. The protrusion may be electrically connected to the second printed circuit board 441 of the second board assembly 44 via an electrical path, such as a flexible printed circuit board. In various embodiments, the second support 32 may be further expanded to correspond to the protrusion.

According to various embodiments, an integrated or single printed circuit board (not separately illustrated) may be provided to replace the first printed circuit board 431 of the first board assembly 43 and the second printed circuit board 441 of the second board assembly 44. The integrated or single printed circuit board may include, for example, a first board part located between the battery 45 and the second side portion 2222 of the case 22 when viewed from above the rear surface 20B of the example electronic device 2, a second board part located between the battery 45 and the fourth side portion 2224 of the case 22, and a third board part interconnecting the first board part and the second board part. The third board part may extend between the battery 45 and the first side portion 2221 of the case 22, or between the battery 45 and the third side portion 2223 of the case 22 when viewed from above the rear surface 20B of the example electronic device 2. The third board part may be implemented to be substantially rigid or flexible. The second support 32 may cover and/or protect the first board part, and the third support 33 may cover and/or protect the second board part. In various embodiments, although not separately illustrated, the second support 32 or the third support 33 may be further expanded to cover and/or protect the third board part. In various embodiments, although not separately illustrated, an integrated or single support may be provided (or formed) to replace the second support 32 and the third support 33.

According to various embodiments, although not separately illustrated, the first board assembly 43 or the second board assembly 44 may include a primary printed circuit board (or a main printed circuit board), a secondary printed circuit board (or a sub-printed circuit board), and/or an interposer board. When viewed from above the rear surface 20B of the example electronic device 2, the primary printed circuit board and the secondary printed circuit board may at least partially overlap each other. The interposer board may be disposed between the primary printed circuit board and the secondary printed circuit board, and may electrically interconnect the primary printed circuit board and the secondary printed circuit board.

According to an embodiment, the battery 45 is a device that supplies power to at least one component of the example electronic device 2, and may include, for example, a non-rechargeable primary battery, a rechargeable secondary battery, or a fuel cell.

According to an embodiment, the metal 51 of the first support 31 may be electrically connected to a first ground structure (not separately illustrated) included in the first board assembly 43. For example, the metal 51 of the first support 31 may be electrically connected to a first ground structure included in the first board assembly 43 via a conductive sticking material (or an adhesive material) and/or a flexible conductor (or a flexible conductive portion or a flexible conductive member) (not separately illustrated) located between the metal 51 (or the second metal area 512) and the first board assembly 43 (or the first printed circuit board 431). The flexible conductor may include, for example, a conductive clip (e.g., a conductive structure including an elastic structure), a pogo-pin, a spring, conductive Poron, conductive sponge, conductive rubber, conductive tape, or a conductive connector.

According to an embodiment, the first ground structure (not separately illustrated) of the first board assembly 43 may include a first ground area included in the first printed circuit board 431 of the first board assembly 43 and/or at least one conductor or metal body electrically connected to the first ground area.

According to an embodiment, the metal 51 of the first support 31 may be electrically connected to a second ground structure (not separately illustrated) included in the second board assembly 44. For example, the metal 51 of the first support 31 may be electrically connected to a second ground structure included in the second board assembly 44 via a conductive sticking material (or an adhesive material) and/or a flexible conductor (or a flexible conductive portion or a flexible conductive member) (not separately illustrated) located between the metal 51 (or the second metal area 512) and the second board assembly 44 (or the second printed circuit board 441).

According to an embodiment, the second ground structure (not separately illustrated) of the second board assembly 44 may include a second ground area included in the second printed circuit board 441 of the second board assembly 44 and/or at least one conductor or metal body electrically connected to the second ground area.

According to an embodiment, the first ground structure (not separately illustrated) of the first board assembly 43 and the second ground structure (not separately illustrated) of the second board assembly 44 may be electrically connected to each other via an electrical connection member (e.g., the flexible printed circuit board 75 in FIG. 7) (not separately illustrated) which electrically interconnects the first board assembly 43 and the second board assembly 44.

According to an embodiment, the metal 51 of the first support 31 may be understood as a "third ground structure".

According to an embodiment, the display module 230 may be electrically connected to the metal 51 of the first support 31 via a conductive material (not separately illustrated) located between the display module 230 and the first support 31. For example, at least one conductive layer (e.g., a metal sheet for electromagnetic shielding, such as a copper sheet) (not separately illustrated) included in the display module 230 may be electrically connected to the metal 51 of the first support 31 via a conductive material (not separately illustrated) located between the at least one conductive layer (not separately illustrated) and the metal 51 (or the second metal area 512). The conductive material located between the display module 230 and the first support 31 may include, for example, a conductive sticking material (or a conductive adhesive material). The conductive material located between the display module 230 and the first support 31 may include, for example, a flexible conductor (or a flexible conductive portion or a flexible conductive member).

According to an embodiment, the at least one conductive layer (e.g., a metal sheet for electromagnetic shielding such as a copper sheet) (not illustrated separately) of the display module 230 electrically connected to the metal 51 of the first support 31 may be understood as a "fourth ground structure".

According to an embodiment, a combination of the first ground structure of the first board assembly 43, the second ground structure of the second board assembly 44, the third ground structure (e.g., the metal 51) of the first support 31, and/or the fourth ground structure of the display module 230 may be understood as a "ground structure (or a ground)" of the example electronic device 2. The ground structure of the example electronic device 2 may further include various other ground structures (e.g., conductors or metal bodies) (not separately illustrated) electrically connected to the first ground structure, the second ground structure, the third ground structure, and/or the fourth ground structure).

According to an embodiment, the ground structure of the example electronic device 2 may reduce or prevent electromagnetic interference (EMI) to electric components included in the example electronic device 2. The ground structure of the example electronic device 2 may reduce or prevent the electromagnetic influence of noise from outside the example electronic device 2 on the electric components included in the example electronic device 2. The ground structure of the example electronic device 2 may reduce or prevent electromagnetic interference between the electric components included in the example electronic device 2.

The example electronic device 2 may include a first conductive area (not separately illustrated) and a second conductive area (not separately illustrated). The first conductive area and the second conductive area may be electrically connected to each other, or may be electrically and physically connected to each other. According to various embodiments of the disclosure, when the first conductive area is configured to substantially radiate electromagnetic waves, the first conductive area of the combination of the first conductive area and the second conductive area may be understood as an antenna radiator, and the second conductive area of the combination of the first conductive area and the second conductive area may operate as a ground structure of the example electronic device 2 that is distinct from the antenna radiator. According to various embodiments of the disclosure, when the first conductive area is configured to substantially radiate electromagnetic waves, the combination of the first conductive area and the second conductive area may operate as a ground structure of the example electronic device 2, and the first conductive area may be understood as an antenna radiator implemented through a portion of the ground structure of the example electronic device 2. According to various embodiments of the disclosure, when the first conductive area is configured to substantially radiate electromagnetic waves, the second conductive area may be configured as an antenna ground that electromagnetically affects the first conductive area (e.g., an antenna radiator). The antenna ground may contribute to securing antenna radiation performance (also referred to as radio wave transmission/reception performance or communication performance) and/or coverage relative to the antenna radiator. The antenna ground may reduce electromagnetic interference (EMI) or signal loss relative to the antenna radiator.

According to an embodiment, some of the ground structures (not separately illustrated) of the example electronic device 2 may be configured as antenna radiators. Some of the ground structures of the example electronic device 2 may be electrically connected to a wireless communication circuit (or a wireless communication module) included in the first board assembly 43 or the second board assembly 44. Some of the ground structures of the example electronic device 2 may receive (or may be fed with) an electromagnetic signal (or wireless signal, RF signal, or radiation current) from a wireless communication circuit and may operate as an antenna radiator (or a radiator, a radiating portion, or a resonator). According to an embodiment, the wireless communication circuit may be described as the wireless communication module 192 of FIG. 1. The wireless communication circuit may include, for example, a wireless communication processor (CP).

According to an embodiment, the first conductive pattern 61 may be at least partially located between the first portion 311 of the first support 31 and the side portion 222 of the case 22.

According to an embodiment, the first conductive pattern 61 may be disposed on or included in the first portion 311 of the first support 31.

According to an embodiment, the first conductive pattern 61 may be disposed on (or coupled with) the first non-metal area 521 included in the first portion 311 of the first support 31.

According to an embodiment, the first conductive pattern 61 may be provided (or formed) separately from at least one first metal area (not separately illustrated) of the metal 51 included in the first portion 311 of the first support 31.

According to an embodiment, the first conductive pattern 61 may include at least one first metal area (not separately illustrated) of the metal 51 included in the first portion 311 of the first support 31. The first conductive pattern 61 may be understood as a part of the first support 31. For example, the first conductive pattern 61 may be physically separated from the second metal area 512 included in the metal 51 of the first support 31. For example, the first conductive pattern 61 may be connected to the second metal area 512 included in the metal 51 of the first support 31 or may extend from the second metal area 512.

According to an embodiment, the first conductive pattern 61 may be located between the first portion 311 of the first support 31 and the side portion 222 of the case 22, and disposed on or coupled to the support surface 31C of the first portion 311.

According to various embodiments, although not separately illustrated, at least a portion of the first conductive pattern 61 may be located inside the first portion 311 of the first support 31. At least a portion of the first conductive pattern 61 may be located, for example, inside the first non-metal area 521 included in the first portion 311 of the first support 31.

According to various embodiments, although not separately illustrated, the first conductive pattern 61 may be disposed on or included in the side portion 222 of the case 22. The first conductive pattern 61 may be disposed on or coupled to, for example, the side portion 222 of the case 22. Although not separately illustrated, the first conductive pattern 61 may be at least partially located inside the side portion 222 of the case 22.

According to an embodiment, the first conductive pattern 61 may be physically separated from a ground structure (or an antenna ground) (not separately illustrated) of the example electronic device 2.

According to an embodiment, the second conductive pattern 62 may be at least partially located between the second portion 312 of the first support 31 and the rear portion 221 of the case 22.

According to an embodiment, the second conductive pattern 62 may be disposed on or included in the second support 32.

According to an embodiment, the second conductive pattern 62 may be disposed on the non-conductive portion of the second support 32.

According to an embodiment, the second conductive pattern 62 may be disposed or formed on the non-conductive portion of the second support 32 through laser direct structuring (LDS).

According to various embodiments, the second conductive pattern 62 may be included in a flexible printed circuit board disposed on the second support 32.

According to an embodiment, the first conductive pattern 61 and the second conductive pattern 62 may be physically spaced apart from each other.

According to an embodiment, when viewed from above the side surface 20C of the example electronic device 2 (e.g., when viewed in the +x-axis direction in FIG. 6), the first conductive pattern 61 and the second conductive pattern 62 may overlap each other.

According to an embodiment, a wireless communication circuit (e.g., the wireless communication module 192 in FIG. 1) included in the example electronic device 2 may be configured to transmit and/or receive a signal in a selected or designated frequency band via the first conductive pattern 61 and the second conductive pattern 62.

According to an embodiment, when the first conductive pattern 61 is disposed on or included in the first portion 311 of the first support 31 or the side portion 222 of the case 22, the first conductive pattern 61 may be close to the exterior of the example electronic device 2 such that electromagnetic influence (e.g., EMI) from conductors (or metal bodies) or electrical elements around the first conductive pattern 61 in the example electronic device 2 can be reduced.

According to an embodiment, when the first conductive pattern 62 is disposed on the second support 32, the second conductive pattern 62 may be close to the exterior (or the case 22) of the example electronic device 2 such that electromagnetic influence (e.g., EMI) from conductors (or metal bodies) or electrical elements around the second conductive pattern 62 in the example electronic device 2 can be reduced.

According to an embodiment, the first flexible conductor 63 may be located between the first printed circuit board 431 and the second conductive pattern 62. The first flexible conductor 63 may be disposed on, for example, the first printed circuit board 431 or the second conductive pattern 62. The flexible conductor 63 may include, for example, a conductive clip, a pogo pin, a spring, conductive Poron, conductive sponge, conductive rubber, conductive tape, or a conductive connector.

According to an embodiment, the second conductive pattern 62 may be electrically connected to a wireless communication circuit (e.g., the wireless communication module 192 in FIG. 1) disposed on the first printed circuit board 431 via the first flexible conductor 63. The position or portion of the second conductive pattern 62 that is in physical contact with the first flexible conductor 63 may be understood as a "feeding point". The wireless communication circuit may provide (or feed) an electromagnetic signal (or wireless signal, RF signal, or radiation current) to the feeding point.

According to an embodiment, the second conductive pattern 62 may be electrically connected to an antenna ground (not separately illustrated). A position or portion of the second conductive pattern 62 that is electrically connected to the antenna ground may be understood as a "grounding point".

According to an embodiment, the second conductive pattern 62 may be electrically connected to the first ground area (not separately illustrated) of the first printed circuit board 431. In substantially the same manner as the manner in which the second conductive pattern 62 is electrically connected to the first printed circuit board 431 via the first flexible conductor 63, the second conductive pattern 62 may be electrically connected to the first ground area of the first printed circuit board 431 via a second flexible conductor (not separately illustrated) located between the first printed circuit board 431 and the second conductive pattern 62. A position or portion of the second conductive pattern 62 that is in physical contact with the second flexible conductor may be understood as a "grounding point".

According to various embodiments, although not separately illustrated, the second conductive pattern 62 may be electrically connected to the metal 51 via a third flexible conductor (not separately illustrated) or a conductive sticking material located between the second conductive pattern 62 and the metal 51 (e.g., a third ground structure) of the first support 31.

According to an embodiment, when it is described that the second conductive pattern 62 is electrically connected to the first ground area (not separately illustrated) of the first printed circuit board 431 and/or the metal 51 of the first support 31 included in a ground structure of the example electronic device 2, it may be interpreted or understood that the second conductive pattern 62 is electrically connected to an antenna ground (not separately illustrated) provided (or formed) by the ground structure (not separately illustrated) of the example electronic device 2.

According to an embodiment, the first conductive pattern 61 may be implemented with at least one first metal area (not separately illustrated) included in the metal 51 of the first support 31. The first conductive pattern 61 may be connected to the second metal area 512 included in the metal 51 of the first support 31 or may extend from the second metal area 512. The connection portion or boundary portion between the first conductive pattern 61 and the second metal area 512 may be referred to as a "ground short portion". The first conductive pattern 61 may be interpreted or understood as being electrically connected to an antenna ground (not separately illustrated) provided (or formed) by a ground structure (not separately illustrated) of the example electronic device 2 via the ground short portion.

According to various embodiments, although not separately illustrated, the positions or number of feeding points or grounding points (and/or ground short portions) for the second conductive pattern 62 may vary.

According to an embodiment, when the wireless communication circuit provides (or feeds) an electromagnetic signal (or wireless signal, RF signal, or radiation current) to the feeding point of the second conductive pattern 62, a signal path through which an electromagnetic signal flows may be provided among the feeding point of the second pattern, the grounding point (and/or the ground short portion) of the second conductive pattern 62, and an antenna ground (not separately illustrated). When an electromagnetic signal is provided (or fed) from a wireless communication circuit to a feeding point, a radiation pattern (or a radiation field or an electromagnetic field) may be provided (or formed) through an electromagnetic connection between the signal path and the antenna ground.

According to an embodiment, the example electronic device 2 may include a transmission line which interconnects a wireless communication circuit (e.g., the wireless communication module 192 in FIG. 1) and a feeding point of the second conductive pattern 62. The transmission line may include, for example, a first flexible conductor 63 and a conductive line (or a wire) included in the first printed circuit board 431. The conductive line may electrically interconnect the first flexible conductor 63 and the wireless communication circuit. The transmission line may transmit an RF signal (voltage or current).

According to an embodiment, when the wireless communication circuit (e.g., the wireless communication module 192 in FIG. 1) provides (or feeds) an electromagnetic signal (or wireless signal, RF signal, or radiation current) to the second conductive pattern 62, the first conductive pattern 61 and the second conductive pattern 62 may be electromagnetically coupled. The first conductive pattern 61 may be located away from the second conductive pattern 62 to electromagnetically affect the second conductive pattern 62. When the wireless communication circuit provides (or feeds) an electromagnetic signal (or wireless signal, RF signal, or radiation current) to the second conductive pattern 62, the first conductive pattern 61 may be indirectly fed with the electromagnetic signal by the second conductive pattern 62. The first conductive pattern 61 may be electromagnetically coupled with the second conductive pattern 62, which is electrically connected to the wireless communication circuit, and operate as an antenna radiator together with the second conductive pattern 62 or adjust a radiation characteristic (e.g., resonance).

According to an embodiment, when the wireless communication circuit (e.g., the wireless communication module 192 in FIG. 1) feeds an electromagnetic signal to the second conductive pattern 62, the first conductive pattern 61 and the second conductive pattern 62 may be electromagnetically coupled with each other with the first portion 311 of the first support 31 interposed therebetween. When an electromagnetic signal is fed to the second conductive pattern 62, the first portion 311 and a structure including the first conductive pattern 61 and the second conductive pattern 62 disposed with the first portion 311 interposed therebetween may form capacitance.

According to an embodiment, the second conductive pattern 62 may be electrically connected to a wireless communication circuit (e.g., the wireless communication module 192 in FIG. 1) and operate as a feeding part (also referred to as a feeding pattern) for indirect feeding an electromagnetic signal to the first conductive pattern 61.

According to an embodiment, the first conductive pattern 61 indirectly fed with an electromagnetic signal from the second conductive pattern 62 may operate as a dummy element (e.g., a dummy antenna). The first conductive pattern 61 may be in an electrically floating state that is physically separated from another conductive element.

According to an embodiment, when providing (or feeding) an electromagnetic signal (or wireless signal, RF signal, or radiation current) to the second conductive pattern 62, electromagnetic coupling between the first conductive pattern 61 and the second conductive pattern 62 may be adjusted. The electromagnetic coupling between the first conductive pattern 61 and the second conductive pattern 62 may shift the resonance frequency to a designated frequency or by a designated amount.

According to an embodiment, the resonance frequency may vary depending on the relative position or shape of the first conductive pattern 61 with respect to the second conductive pattern 62, and/or the relative position of the second conductive pattern 62 with respect to the first conductive pattern 61.

According to an embodiment, when providing (or feeding) an electromagnetic signal (or wireless signal, RF signal, or radiation current) to the second conductive pattern 62, the first conductive pattern 61 may expand a bandwidth capable of transmitting or receiving a signal or form different frequency bands (e.g., multiple bands).

According to an embodiment, when providing (or feeding) an electromagnetic signal (or wireless signal, RF signal, or radiation current) to the second conductive pattern 62, the first conductive pattern 61 may reduce electromagnetic noise to improve antenna radiation performance. The first conductive pattern 61 may improve antenna gain in a selected or designated frequency band.

According to an embodiment, the electromagnetic coupling between the first conductive pattern 61 and the second conductive pattern 62 may occur substantially most frequently in the portion where the first conductive pattern 61 and the second conductive pattern 62 overlap each other. For example, the resonance frequency may vary depending on the positions, shapes, and/or number of portions (or areas) where the first conductive pattern 61 and the second conductive pattern 62 overlap each other.

According to an embodiment, since the first portion 311 of the first support 31 is configured to be in direct or indirect contact with the rear portion 221 of the case 22 via the second surface S2 for waterproofing and/or dustproofing, there may be limitations in expanding or extending the second conductive pattern 62 toward the side portion 222 of the case 22. In order to address these limitations, the disclosure is capable of securing or improving antenna radiation performance, radio wave transmission/reception performance, or coverage through the first conductive pattern 61 electromagnetically coupled to the second conductive pattern 62. Without expanding or extending the second conductive pattern 62 toward the side portion 222 of the case 22, the first conductive pattern 61 is capable of providing substantially the same effect as expanding or extending an antenna radiator toward the side portion 222 of the case 22. Without expanding or extending the second conductive pattern 62 toward the side portion 222 of the case, the first conductive pattern 61 is capable of providing substantially the same effect as extending an electrical length (e.g., the length indicated by a ratio of wavelengths).

According to an embodiment, the antenna radiator including a combination of the first conductive pattern 61 and the second conductive pattern 62 may have an electrical length (e.g., the length indicated by a ratio of wavelengths) corresponding to a resonance frequency in a selected or designated frequency band through the electromagnetic coupling between the first conductive pattern 61 and the second conductive pattern 62. The antenna radiator including a combination of the first conductive pattern 61 and the second conductive pattern 62 may provide a radiation pattern (or beam pattern) capable of substantially smoothly transmitting and/or receiving a signal in at least one direction through the electromagnetic coupling between the first conductive pattern 61 and the second conductive pattern 62.

According to an embodiment, the example electronic device 2 may include a matching circuit (not separately illustrated) electrically connected to a transmission line for the second conductive pattern 62. The matching circuit may adjust resonance. The matching circuit may include a frequency adjustment circuit and may shift the resonance frequency to a designated frequency or by a designated amount. The matching circuit may reduce reflection (or amount of reflection) at a selected or designated frequency (or operating frequency or use frequency). The matching circuitry may reduce power losses at a selected or designated frequency. The matching circuit have an element value that is capable of matching the impedance between the wireless communication circuit (e.g., the wireless communication module 192 in FIG. 1) and the antenna radiator (e.g., a combination of the first conductive pattern 61 and the second conductive pattern 62). The matching circuit may include, for example, one or more electrical elements (e.g., lumped elements or passive elements) having a component such as capacitance, inductance, or conductance, or a circuit implemented by a combination of these electrical elements.

According to various embodiments, the matching circuit may reduce electromagnetic influence (e.g., EMI) on an antenna radiator (e.g., the combination of the first conductive pattern 61 and the second conductive pattern 62) from surrounding electrical elements (e.g., antenna radiators or metal bodies). The matching circuit may allow the antenna radiator (e.g., the combination of the first conductive pattern 61 and the second conductive pattern 62) to have a designated isolation with respect to surrounding electrical elements within the example electronic device 2.

According to an embodiment, the wireless communication circuit (e.g., the wireless communication module 192 in FIG. 1) of the example electronic device 2 may process a transmitted signal or a received signal in at least one selected or designated frequency band via the antenna radiator (e.g., the combination of the first conductive pattern 61 and the second conductive pattern 62). The selected or designated frequency band may include, for example, at least one of a low band (LB) (about 600 MHz to about 1 GHZ), a middle band (MB) (about 1 GHz to about 2.3 GHz), a high band (HB) (about 2.3 GHz to about 2.7 GHZ), or an ultra-high band (UHB) (about 2.7 GHz to about 6 GHZ). The selected or designated frequency band may include various other frequency bands.

According to an embodiment, the case 22 may be configured to have a dielectric constant (e.g., a low dielectric constant) that is capable of reducing the degradation of antenna radiation performance for the antenna radiator including the combination of the first conductive pattern 61 and the second conductive pattern 62, or ensuring the antenna radiation performance.

According to an embodiment, the first portion 311 of the first support 31 may include a non-conductive portion located between the first conductive pattern 61 and the second conductive pattern 62. The non-conductive portion may be, for example, a portion of the first non-metal area 521. When feeding an electromagnetic signal to a wireless communication circuit (e.g., the wireless communication module 192 in FIG. 1), the first conductive pattern 61 and the second conductive pattern 62 may be electromagnetically coupled with the non-conductive portion interposed therebetween (or through the non-conductive portion). The non-conductive portion may be configured to have a dielectric constant that is capable of reducing the degradation of antenna radiation performance for the antenna radiator including the combination of the first conductive pattern 61 and the second conductive pattern 62 or ensuring the antenna radiation performance.

According to various embodiments, the non-conductive portion of the first portion 311 of the first support 31 located between the first conductive pattern 61 and the second conductive pattern 62 may be disposed in an opening (not separately illustrated) formed in the first portion 311 (or the first non-metal area 521), and may include a non-metal material different from the first non-metal area 521.

According to an embodiment, the antenna radiator including the combination of the first conductive pattern 61 and the second conductive pattern 62 may be located away from the display module 230 to reduce the electromagnetic influence (e.g., EMI) from the display module 230.

According to various embodiments, the first conductive pattern 61 and/or the second conductive pattern 62 may be configured to reduce the likelihood that the position thereof will correspond to the grip position of a user's hand relative to the example electronic device 2. Reducing the likelihood that the position of the first conductive pattern 61 and/or the second conductive pattern 62 will correspond to the grip position of the user's hand relative to the example electronic device 2 is capable of reducing the likelihood that the radiation performance will be degraded by the user's hand (e.g., a dielectric material).

According to an embodiment, although not separately illustrated, the first conductive pattern 61 may be located to at least partially correspond to the second corner 2226 of the case 22 in order to reduce the likelihood that the first conductive pattern 61 will correspond to the grip position of the user's hand. The first conductive pattern 61 may include, for example, a second corner pattern area corresponding to the second corner 2226 of the case 22, a pattern area extending from the second corner pattern to the second side portion 2222 of the case 22, and/or a pattern area extending from the second corner pattern area to the third side portion 2223 of the case 22. In various embodiments, the first conductive pattern 61 may be provided (or formed) in the form in which the pattern area extending from the second corner pattern area to the second side portion 2222 and/or the pattern extending from the second corner pattern area to the third side portion 2223 is omitted.

According to various embodiments, although not separately illustrated, the first conductive pattern 61 may be located to be at least partially correspond to the first corner 2225 of the case 22 in order to reduce the likelihood that the first conductive pattern 61 will correspond to the grip position of the user's hand. The first conductive pattern 61 may include, for example, a first corner pattern area corresponding to the first corner 2225 of the case 22, a pattern area extending from the first corner pattern to the first side portion 2221 of the case 22, and/or a pattern area extending from the first corner pattern area to the second side portion 2222 of the case 22. In various embodiments, the first conductive pattern 61 may be provided (or formed) in the form in which the pattern area extending from the first corner pattern area to the first side portion 2221 and/or the pattern extending from the first corner pattern area to the second side portion 2222 is omitted.

Although not separately illustrated, the shape of the second conductive pattern 62, which is provided (or fed) with an electromagnetic signal (or wireless signal, RF signal, or radiation current) from a wireless communication circuit (e.g., the wireless communication module 192 of FIG. 1), may vary.

Although not separately illustrated, the position and/or shape of the combination of the first conductive pattern 61 and the second conductive pattern 62 may vary.

Hereinafter, various examples that are substantially the same as or at least partially similar to the combination of the first conductive pattern 61 and the second conductive pattern 62 will be described with reference to FIGS. 7 and 8.

FIG. 7 is an exploded perspective view of an example electronic device 2 according to various embodiments. FIG. 8 is a perspective view illustrating a combination of metal 51, a third conductive pattern 71, a fourth conductive pattern 72, a fifth conductive pattern 73, and a sixth conductive pattern 74 according to various embodiments. It will be understood that the disclosure conceives and includes all of the combinations of features and/or embodiments disclosed with reference to FIGS. 7 and 8. For example, all of the combinations of features described below with reference to FIGS. 7 and 8 are to be considered as being included in the disclosure as specific examples.

Figure 8:
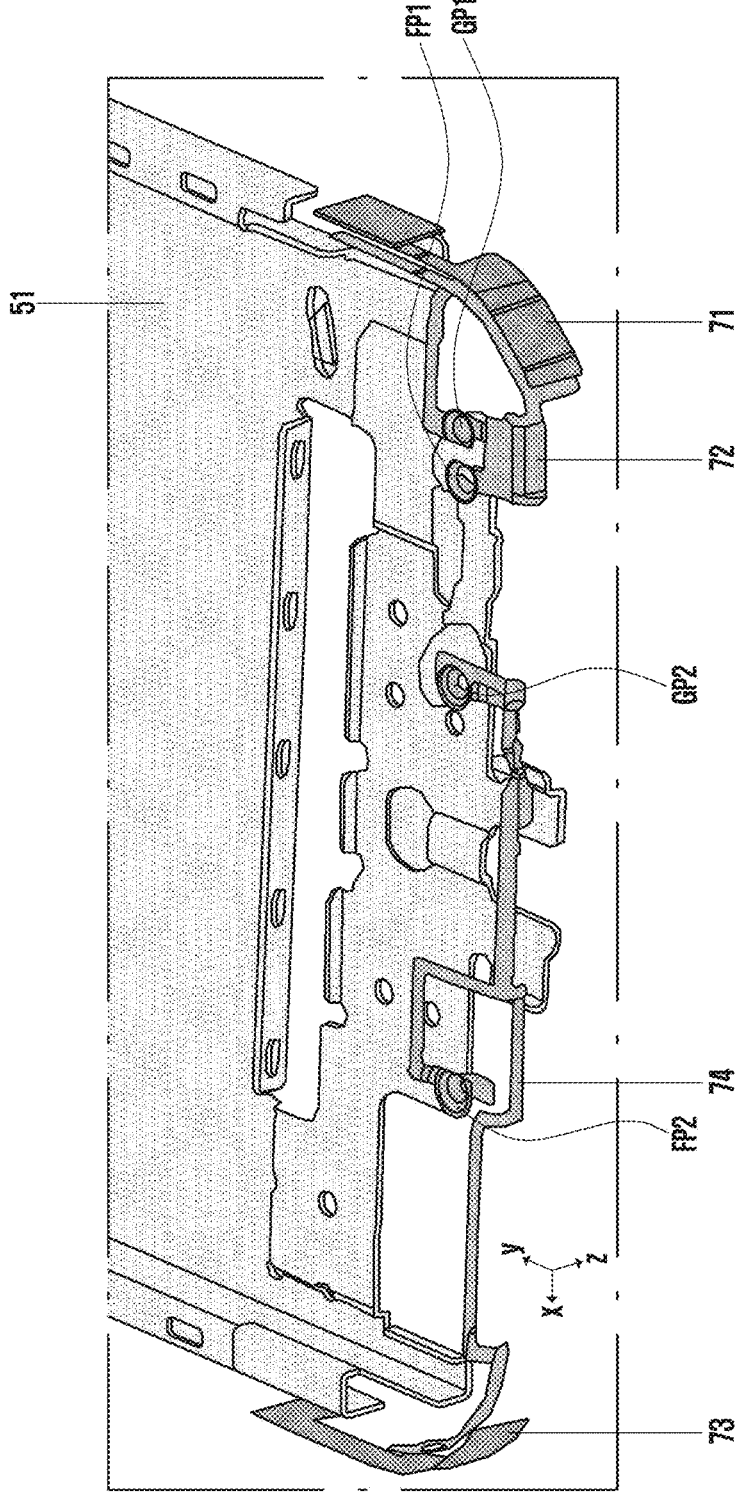
FIG. 8 is a perspective view illustrating a combination of first metal, a third conductive pattern, a fourth conductive pattern, a fifth conductive pattern, and a sixth conductive pattern according to various embodiments.

Referring to FIGS. 7 and 8, an example electronic device 2 may include a front cover 21, a case 22, a first support 31, a second support 32, a third support 33, a first camera module 241, a second camera module 242, a third camera module 243, a first light-emitting module 250, a battery 45, a third conductive pattern 71, a fourth conductive pattern 72, a fifth conductive pattern 73, a sixth conductive pattern 74, an antenna structure 73, a flexible printed circuit board 75, and/or an antenna structure 76. Descriptions of some components of FIGS. 7 and 8 that are indicated by the same reference numerals as those illustrated in FIGS. 2, 3, and 4 may not be repeated here.

According to an embodiment, the third conductive pattern 71 may be disposed on or included in the first portion 311 of the first support 31 or the side portion 222 of the case 22 to be substantially the same as or at least partially similar to the first conductive pattern 61 of FIG. 6 that is disposed on or included in the first portion 311 of the first support 31 or the side portion 222 of the case 22. The fourth conductive pattern 72 may be disposed on the third support 33 to be substantially the same as or at least partially similar to the second conductive pattern 62 of FIG. 6 that is disposed on the second support 32.

According to an embodiment, the fourth conductive pattern 72 may be provided (or fed) with an electromagnetic signal (or wireless signal, RF signal, or radiation current) from a wireless communication circuit (e.g., the wireless communication module 192 of FIG. 1). The wireless communication circuit may be configured to transmit and/or receive a signal in a selected or designated frequency band via the third conductive pattern 71 and the fourth conductive pattern 72. When the wireless communication circuit provides (or feeds) an electromagnetic signal to the fourth conductive pattern 72, the third conductive pattern 71 and the fourth conductive pattern 72 may be electromagnetically coupled.

According to an embodiment, the third conductive pattern 71 may be located to at least partially correspond to the third corner 2227 of the case 22. For example, placing the third conductive pattern 71 to correspond to the third corner 2227 of the case 22 may be intended to reduce the likelihood that the third conductive pattern 71 will correspond to the grip position of the user's hand. The third conductive pattern 71 may include, for example, a third corner pattern area corresponding to the third corner 2227 of the case 22 and a pattern area extending from the third pattern area to the third side portion 2223 of the case 22. In various embodiments, although not separately illustrated, the third conductive pattern 71 may be provided (or formed) in a shape including a pattern area extending from the third corner pattern area to the fourth side portion 2224 of the case 22. In various embodiments, although not separately illustrated, the third conductive pattern 71 may be provided (or formed) in a shape in which a pattern area extending from the third corner pattern area to the third side portion 2223 of the case 22 is omitted.

According to various embodiments, the shape and/or position of the fourth conductive pattern 72, which is provided (or fed) with an electromagnetic signal (or wireless signal, RF signal, or radiation current) from a wireless communication circuit (e.g., the wireless communication module 192 of FIG. 1), may vary without being limited to the illustrated example.

According to an embodiment, the fourth conductive pattern 72 may include a first feeding point FP1 and a first grounding point GP1. The wireless communication circuit (e.g., the wireless communication module 192 in FIG. 1) may provide (or feed) an electromagnetic signal (or wireless signal, RF signal, or radiation current) to the fourth conductive pattern 72 via the first feeding point FP1. The first grounding point GP1 of the fourth conductive pattern 72 may be electrically connected to an antenna ground (not separately illustrated) of the example electronic device 2. Although not separately illustrated, the positions or number of first feeding points FP1 or first grounding points GP1 may vary without being limited to the illustrated example.

According to an embodiment, the second conductive pattern 62 of FIG. 6 may be electrically connected to the second printed circuit board 441 (see FIG. 4) to be substantially the same as or at least partially similar to the second conductive pattern 62 of FIG. 6 that is electrically connected to the first printed circuit board 431 via the first flexible conductor 63. A wireless communication circuit (e.g., the wireless communication module 192 in FIG. 1) may be disposed on the first printed circuit board 431 (see FIG. 4). The wireless communication circuit may provide (or feed) an electromagnetic signal (or wireless signal, RF signal, or radiation current) to the first feeding point FP1 of the fourth conductive pattern 72 via another electrical connection member (not separately illustrated) such as a flexible printed circuit board 75 or a cable that electrically interconnects the first printed circuit board 431 (see FIG. 4) and the second printed circuit board 441 (see FIG. 4).

According to an embodiment, the first grounding point GP1 of the fourth conductive pattern 72 may be electrically connected to the second ground area of the second printed circuit board 441 (see FIG. 4) to be substantially the same as or at least partially similar to the second conductive pattern 62 of FIG. 6 that is electrically connected to the first ground area (not separately illustrated) of the first printed circuit board 431.

According to an embodiment, the first grounding point GP1 of the fourth conductive pattern 72 may be electrically connected to the metal 51 of the first support 31 to be substantially the same as or at least partially similar to the second conductive pattern 62 of FIG. 6 that is electrically connected to the metal 51 of the first support 31.

According to an embodiment, when it is described that the fourth conductive pattern 72 is electrically connected to the second ground area (not separately illustrated) of the second printed circuit board 441 and/or the metal 51 of the first support 31 included in a ground structure of the example electronic device 2, it may be understood that the fourth conductive pattern 72 is electrically connected to an antenna ground (not separately illustrated) provided (or formed) by the ground structure (not separately illustrated) of the example electronic device 2.

According to an embodiment, the fifth conductive pattern 73 may be disposed on or included in the first portion 311 of the first support 31 or the side portion 222 of the case 22 to be substantially the same as or at least partially similar to the first conductive pattern 61 of FIG. 6 that is disposed on or included in the first portion 311 of the first support 31 or the side portion 222 of the case 22. The sixth conductive pattern 74 may be disposed on the third support 33 to be substantially the same as or at least partially similar to the second conductive pattern 62 of FIG. 6 that is disposed on the second support 32.

According to an embodiment, the sixth conductive pattern 74 may be provided (or fed) with an electromagnetic signal (or wireless signal, RF signal, or radiation current) from a wireless communication circuit (e.g., the wireless communication module 192 of FIG. 1). The wireless communication circuit may be configured to transmit and/or receive a signal in a selected or designated frequency band via the fifth conductive pattern 73 and the sixth conductive pattern 76. When the wireless communication circuit provides (or feeds) an electromagnetic signal to the sixth conductive pattern 74, the fifth conductive pattern 73 and the sixth conductive pattern 76 may be electromagnetically coupled.

According to an embodiment, the fifth conductive pattern 73 may be located to at least partially correspond to the fourth corner 2228 of the case 22. For example, placing the fifth conductive pattern 73 to correspond to the fourth corner 2228 of the case 22 may be intended to reduce the likelihood that the third conductive pattern 71 will correspond to the grip position of the user's hand. The fifth conductive pattern 73 may include, for example, a fourth corner pattern area corresponding to the fourth corner 2228 of the case 22 and a pattern area extending from the fourth pattern area to the first side portion 2221 of the case 22. In various embodiments, although not separately illustrated, the fifth conductive pattern 73 may be provided (or formed) in a shape including a pattern area extending from the fourth corner pattern area to the fourth side portion 2224 of the case 22. In various embodiments, although not separately illustrated, the fourth conductive pattern 73 may be provided (or formed) in a shape in which a pattern area extending from the fourth corner pattern area to the first side portion 2221 of the case 22 is omitted.

According to various embodiments, the shape and/or position of the sixth conductive pattern 74, which is provided (or fed) with an electromagnetic signal (or wireless signal, RF signal, or radiation current) from a wireless communication circuit (e.g., the wireless communication module 192 of FIG. 1), may vary without being limited to the illustrated example.

According to an embodiment, the sixth conductive pattern 74 may include a second feeding point FP2 and a second grounding point GP2. The wireless communication circuit (e.g., the wireless communication module 192 in FIG. 1) may provide (or feed) an electromagnetic signal (or wireless signal, RF signal, or radiation current) to the sixth conductive pattern 74 via the second feeding point FP2. The second grounding point GP2 of the sixth conductive pattern 74 may be electrically connected to an antenna ground (not separately illustrated) of the example electronic device 2. Although not separately illustrated, the positions or number of second feeding points FP2 or second grounding points GP2 may vary without being limited to the illustrated example.

According to an embodiment, the sixth conductive pattern 74 of FIG. 6 may be electrically connected to the second printed circuit board 441 (see FIG. 4) to be substantially the same as or at least partially similar to the second conductive pattern 62 of FIG. 6 that is electrically connected to the first printed circuit board 431 via the first flexible conductor 63. The wireless communication circuit (e.g., the wireless communication module 192 in FIG. 1) disposed on the first printed circuit board 431 (see FIG. 4) may provide (or feed) an electromagnetic signal (or wireless signal, RF signal, or radiation current) to the second feeding point FP2 of the sixth conductive pattern 74 via another electrical connection member (not separately illustrated) such as a flexible printed circuit board 75 or a cable that electrically interconnects the first printed circuit board 431 (see FIG. 4) and the second printed circuit board 441 (see FIG. 4).

According to an embodiment, the second grounding point GP2 of the sixth conductive pattern 74 may be electrically connected to the second ground area of the second printed circuit board 441 (see FIG. 4) to be substantially the same as or at least partially similar to the second conductive pattern 62 of FIG. 6 that is electrically connected to the first ground area (not separately illustrated) of the first printed circuit board 431.

According to an embodiment, the second grounding point GP2 of the sixth conductive pattern 74 may be electrically connected to the metal 51 of the first support 31 to be substantially the same as or at least partially similar to the second conductive pattern 62 of FIG. 6 that is electrically connected to the metal 51 of the first support 31.

According to an embodiment, when it is described that the sixth conductive pattern 74 is electrically connected to the second ground area (not separately illustrated) of the second printed circuit board 441 and/or the metal 51 of the first support 31 included in a ground structure of the example electronic device 2, it may be interpreted or understood that the sixth conductive pattern 74 is electrically connected to an antenna ground (not separately illustrated) provided (or formed) by the ground structure (not separately illustrated) of the example electronic device 2.

According to an embodiment, a combination of the third conductive pattern 71 and the fourth conductive pattern 72 and a combination of the fifth conductive pattern 73 and the sixth conductive pattern 74 be located away from each other to reduce electromagnetic influence (e.g., EMI).

According to an embodiment, the antenna structure 76 may be located between the second support 32 and the rear portion 221 of the case 22. The antenna structure 76 may be disposed on, for example, the second support 32. The antenna structure 73 may be implemented in the form of a film such as an FPCB.

According to an embodiment, the antenna structure 76 may include at least one conductive pattern used as a loop-type radiator. For example, the at least one conductive pattern may include a planar spiral conductive pattern (e.g., a planar coil or a pattern coil).

According to an embodiment, at least one conductive pattern of the antenna structure 76 may be electrically connected to a wireless communication circuit (e.g., the wireless communication module 192 in FIG. 1) disposed on the first printed circuit board 431 (see FIG. 4). The wireless communication circuit may be configured to transmit and/or receive a signal in a near-field communication (NFC) band, for example, through at least one conductive pattern of the antenna structure 73. The wireless communication circuit may be configured to transmit and/or receive a magnetic signal, for example, via at least one conductive pattern of the antenna structure 76.

According to an embodiment, the antenna structure 76 may be located to reduce electromagnetic influence (e.g., EMI) on at least one antenna radiator, such as the combination of the first conductive pattern 61 and the second conductive pattern 62 in FIG. 6. For example, the antenna structure 76 may not overlap the combination of the first conductive pattern 61 and the second conductive pattern 62 of FIG. 6 when viewed from above the rear surface 20B (see FIG. 2) of the example electronic device 2.

Figure 9:
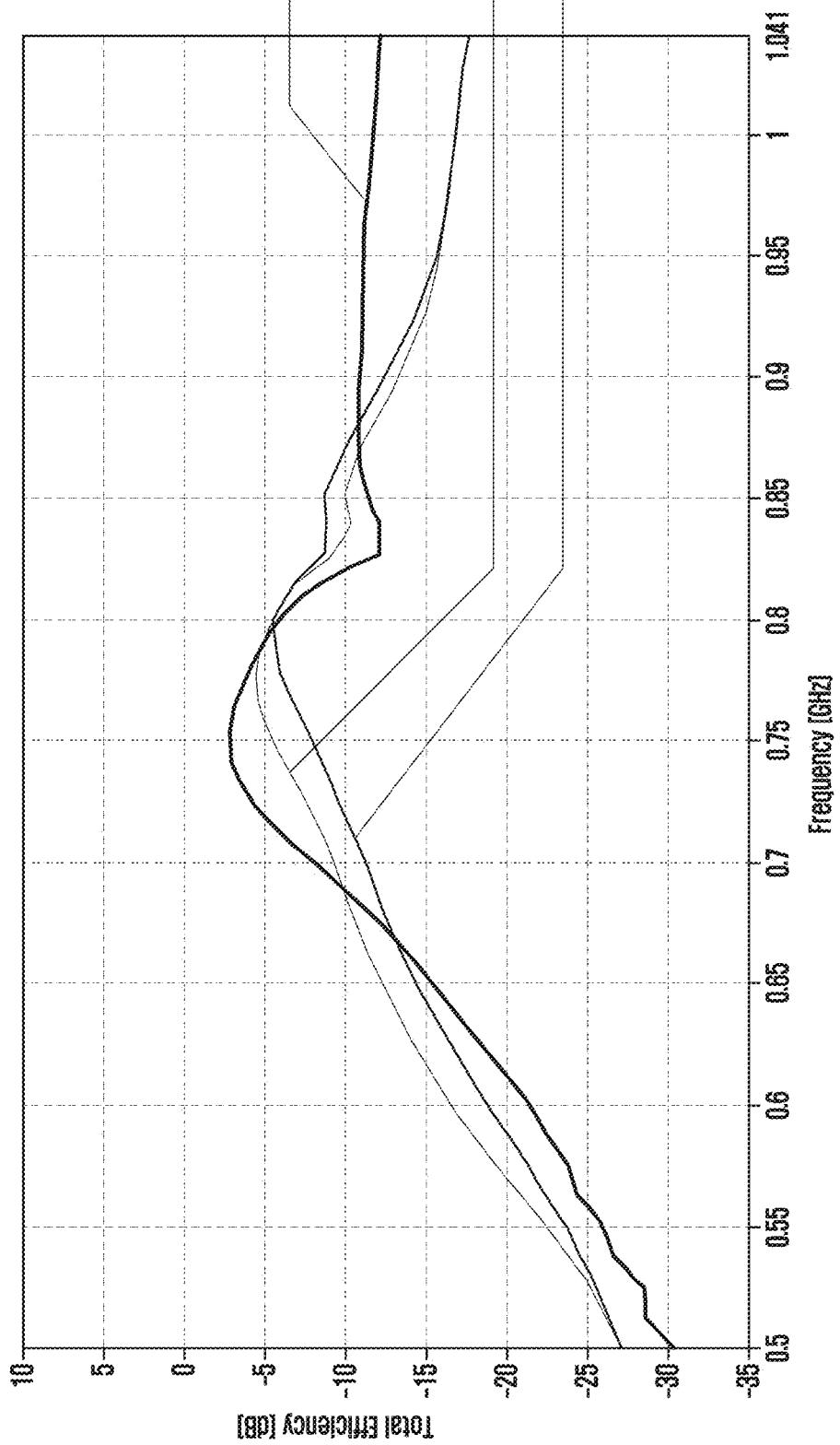
FIG. 9 is a graph illustrating antenna radiation performances of an example electronic device, an electronic device of a first comparative example, and an electronic device of a second comparative example in a first frequency band according to various embodiments.
Figure 11:
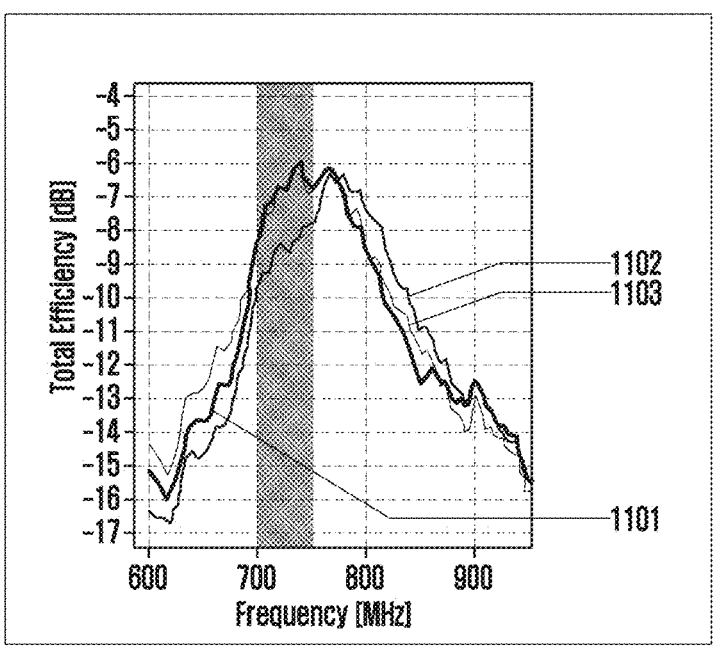
FIGS. 11 and 12 include graphs illustrating antenna radiation performances of the example electronic device, the electronic device of the first comparative example, and the electronic device of the second comparative example at each first frequency band according to various embodiments.
Figure 11:
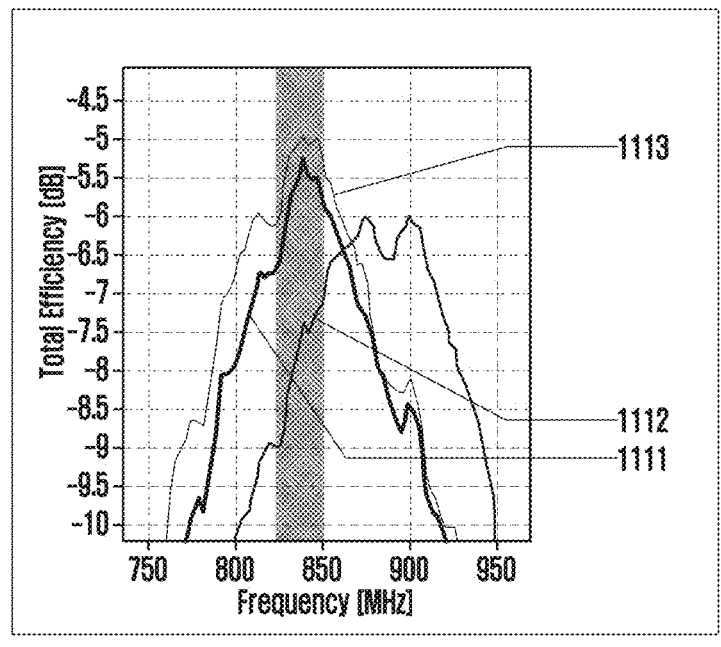
Figure 12:
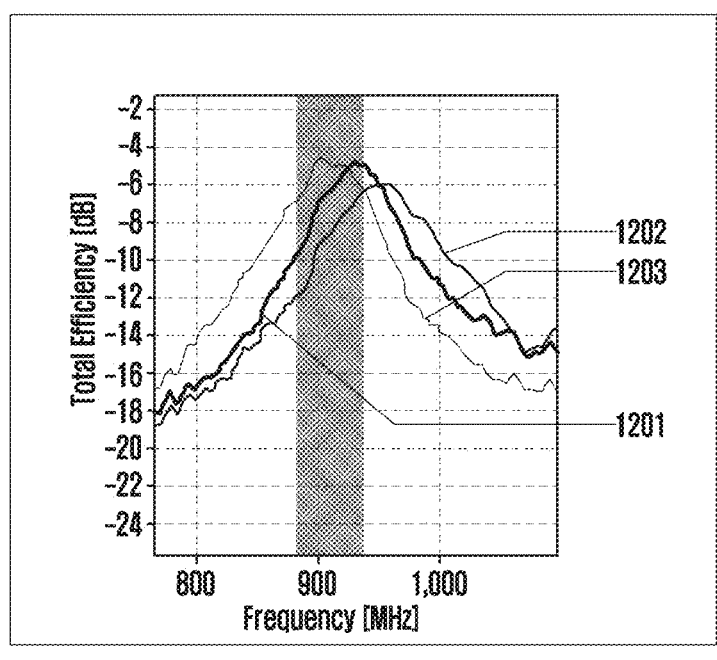
Figure 12:
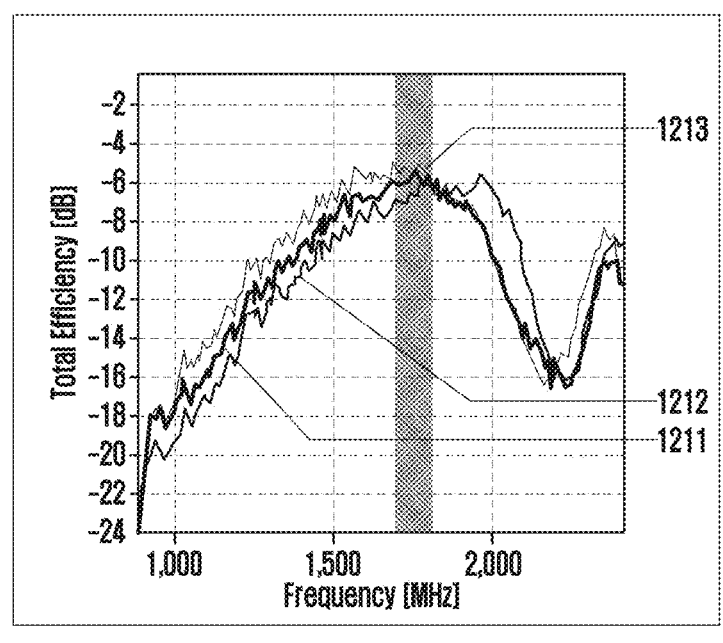

FIG. 9 includes graphs illustrating antenna radiation performances of an example electronic device 2 according to an example embodiment of the disclosure, an electronic device of a first comparative example, and an electronic device of a second comparative example in a first frequency band according to various embodiments. FIG. 10 is a table showing the total radiated powers (TRPs) of the example electronic device 2 according to an embodiment of the disclosure, the electronic device of the first comparative example, and the electronic device of the second comparative example in each frequency band according to various embodiments. FIGS. 11 and 12 are graphs illustrating antenna radiation performances of the example electronic device 2 according to an embodiment of the disclosure, the electronic device of the first comparative example, and the electronic device of the second comparative example at each first frequency band according to various embodiments.

Compared to the example electronic device 2 of the disclosure, the electronic device (not separately illustrated) of the first comparative example may not have the first conductive pattern 61 (see FIG. 6).

Compared to the example electronic device 2 of the disclosure (see FIG. 6), the second comparative example electronic device (not separately illustrated) may have the second support 32 expanded or extended toward the side portion 222 of the case 22. Compared to the example electronic device 2 of the disclosure (see FIG. 6), the electronic device of the second comparative example may take a form in which, instead of the first conductive pattern 61, the second conductive pattern 62 (see FIG. 6) is expanded or extended toward the side portion 222 of the case 22 through the second support 32. The example electronic device 2 of the disclosure (see FIG. 6) provides the first portion 311 including the second surface S2 configured to be in direct or indirect contact with the rear portion 221 of the case 22 for waterproofing and/or dustproofing, but the electronic device of the second comparative example does not include the first portion 311 due to the expansion of the second support 32.

Referring to FIG. 9, reference numeral "910" denotes a graph showing the antenna radiation performance of the example electronic device 2 of the disclosure in the first frequency band (e.g., about 703 MHz to about 750 MHZ). Reference numeral "920" denotes a graph showing the antenna radiation performance of the electronic device of the first comparative example (not separately illustrated) in the first frequency band. Reference numeral "930" denotes a graph showing the antenna radiation performance of the electronic device of the second comparative example (not separately illustrated) in the first frequency band.

Compared to the electronic device of the first comparative example, the example electronic device 2 of the disclosure (see FIG. 6) may be improved in antenna radiation performance in the first frequency band by further including the first conductive pattern 61 electromagnetically coupled to the second conductive pattern 62.

Compared to the electronic device of the second comparative example, the example electronic device 2 of the disclosure may secure waterproofing and/or dustproofing performance. Through the electromagnetic coupling between the first conductive pattern 61 and the second conductive pattern 62, the example electronic device 2 of the disclosure may have an antenna radiation performance substantially corresponding to or improved than that of the electronic device of the second comparative example in the first frequency band.

According to an embodiment, the example electronic device 2 of the disclosure may be configured to transmit and/or receive a signal in a first frequency band having a center frequency (or resonance frequency) of about 0.75 GHz via the first conductive pattern 61 and the second conductive pattern 62.

Referring to FIG. 10, compared to the electronic device of the first comparative example, by further including the first conductive pattern 61 electromagnetically coupled to the second conductive pattern 62 may have an improved antenna performance with a substantially higher TRP in the first frequency band (e.g., about 703 MHz to about 750 MHZ), the second frequency band (e.g., about 824 MHz to about 849 MHZ), the third frequency band (e.g., about 880 MHz to about 915 MHZ), and the fourth frequency band (e.g., about 1710 MHz to about 1785 MHZ).

Through the electromagnetic coupling between the first pattern 61 and the second conductive pattern 62, the example electronic device 2 of the disclosure may have an antenna performance substantially corresponding to that of the electronic device of the second comparative example or may have an antenna radiation performance with a TRP that is improved than that of the electronic device of the second comparative example in the first frequency band, the second frequency band, the third frequency band, and the fourth frequency band.

Referring to FIG. 11, reference numeral "1101" denotes a graph showing the antenna radiation performance of the example electronic device 2 of the disclosure in the first frequency band (e.g., about 703 MHz to about 750 MHZ). Reference numeral "1102" denotes a graph showing the antenna radiation performance of the electronic device of the first comparative example in the first frequency band. Reference numeral "1103" denotes a graph showing the antenna radiation performance of the electronic device of the second comparative example in the first frequency band.

Reference numeral "1111" denotes a graph showing the antenna radiation performance of the example electronic device 2 of the disclosure in the second frequency band (e.g., about 824 MHz to about 849 MHz). Reference numeral "1112" denotes a graph showing the antenna radiation performance of the electronic device of the first comparative example in the second frequency band. Reference numeral "1113" denotes a graph showing the antenna radiation performance of the electronic device of the second comparative example in the second frequency band.

Referring to FIG. 12, reference numeral "1201" denotes a graph showing the antenna radiation performance of the example electronic device 2 of the disclosure in the third frequency band (e.g., about 880 MHz to about 915 MHZ). Reference numeral "1202" denotes a graph showing the antenna radiation performance of the electronic device of the first comparative example in the third frequency band. Reference numeral "1203" denotes a graph showing the antenna radiation performance of the electronic device of the second comparative example in the third frequency band.

Reference numeral "1211" denotes a graph showing the antenna radiation performance of the example electronic device 2 of the disclosure in the fourth frequency band (e.g., about 1710 MHz to about 1785 MHZ). Reference numeral "1212" denotes a graph showing the antenna radiation performance of the electronic device of the first comparative example in the fourth frequency band. Reference numeral "1213" denotes a graph showing the antenna radiation performance of the electronic device of the second comparative example in the fourth frequency band.

Referring to the graphs of FIGS. 11 and 12, compared to the electronic device of the first comparative example, by further including the first conductive pattern 61 electromagnetically coupled to the second conductive pattern 62, the example electronic device 2 may have an improved antenna radiation performance in the first frequency band, the second frequency band, the third frequency band, and the fourth frequency band. Through the electromagnetic coupling between the first pattern 61 and the second conductive pattern 62, the example electronic device 2 of the disclosure may have an antenna performance substantially corresponding to that of the electronic device of the second comparative example or may have an antenna radiation performance with a TRP that is improved than that of the electronic device of the second comparative example in the first frequency band, the second frequency band, the third frequency band, and the fourth frequency band.

According to an example embodiment of the disclosure, the electronic device includes a front cover, a case, a support (e.g., the first support 31), a first conductive pattern, a second conductive pattern, a wireless communication circuit (e.g., the wireless communication module 192), and/or a seal. The front cover forms at least a portion of a front surface of the electronic device. The case includes a rear portion that forms at least a portion of the rear surface of the electronic device and a side portion that forms at least a portion of the side surface of the electronic device. The case is non-conductive. The support is positioned between the front cover and the case. The support includes a first portion and a second portion. The first portion is positioned between the second portion and the side portion. The first conductive pattern is disposed between the first portion and the side portion. The second conductive pattern is positioned between the second portion and the rear portion and is spaced apart from the first conductive pattern. The wireless communication circuit is configured to transmit a signal in a designated frequency band via the first conductive pattern and the second conductive pattern. The seal is disposed between the first portion and the rear portion and configured to block fluid flow from a first area where the first conductive pattern is disposed to a second area where the second conductive pattern is disposed.

According to an example embodiment of the disclosure, a wireless communication circuit (e.g., the wireless communication module 192) may be configured to feed an electromagnetic signal to the second conductive pattern. The first portion may include a non-conductive portion (e.g., the first non-metal area 521) at least partially positioned between the first conductive pattern and the second conductive pattern. The first conductive pattern and the second conductive pattern may be coupled electromagnetically through the non-conductive portion.

According to an example embodiment of the disclosure, the first conductive pattern and the second conductive pattern may overlap when viewed toward the side surface.

According to an example embodiment of the disclosure, the first conductive pattern and the second conductive pattern are may be spaced apart from each other with the first portion interposed therebetween, wherein the first portion extends toward the rear portion to contact the support (e.g., the first support 31) to the rear portion via the seam.

According to an example embodiment of the disclosure, the first portion may extend in a loop shape along the side portion.

According to an example embodiment of the disclosure, the seal may include an elastic material pressed between the first portion and the rear portion.

According to an example embodiment of the disclosure, the seal may include an adhesive configured to couple the first portion and the rear portion.

According to an example embodiment of the disclosure, the electronic device may further include a non-conductive support (e.g., the second support 32) positioned between the second portion of the support (e.g., the first support 31) and the rear portion of the case. The non-conductive support may be disposed on the second portion. The second conductive pattern may be disposed on the non-conductive support.

According to an example embodiment of the disclosure, the electronic device may further include a printed circuit board (e.g., the first printed circuit board 431). The printed circuit board may be at least partially positioned between the second portion and the non-conductive support (e.g., the second support 32). The printed circuit board may be disposed on the second portion. The wireless communication circuit (e.g., the wireless communication module 192) may be disposed on the printed circuit board. The wireless communication circuit may be electrically connected to the second conductive pattern through a flexible conductor (e.g., the first flexible conductor 63) positioned between the printed circuit board and the second conductive pattern.

According to an example embodiment of the disclosure, the printed circuit board (e.g., the first printed circuit board 431) may include a ground area (e.g., the first ground area). The second portion may include another ground area (e.g., the second metal area 512) electrically connected to the ground area of the printed circuit board. The second conductive pattern may be electrically connected to the ground area of the printed circuit board or the ground area of the second portion.

According to an example embodiment of the disclosure, the support (e.g., the first support 31) may include a metal. The metal may include a first metal area included in the first portion and a second metal area included in the second portion. The first conductive pattern may be included in the first metal area.

According to an example embodiment of the disclosure, the first portion may be detachable from the side portion.

According to an example embodiment of the disclosure, the side portion may include a first side portion and a second side portion. The first conductive pattern may extend from the first side portion to a corner where the first side portion and the second side portion are connected to each other.

According to an example embodiment of the disclosure, the first conductive pattern may further extend to the second side portion.

According to an example embodiment of the disclosure, the electronic device may further include a display module including a display and a sticking member comprising an adhesive. The display module may be positioned between the front cover and the support (e.g., the first support 31). The display module may be visible through the front cover. The sticking member may be disposed between the front cover and the first portion. The sticking member may be configured to bond the front cover and the support. The sticking member may be configured to block fluid from flowing from the outside of the electronic device into the space between the support and the front cover where the display module is positioned.

According to an example embodiment of the disclosure, the electronic device includes a front cover, a case, a support (e.g., the first support 31), a first conductive pattern, a second conductive pattern, a wireless communication circuit (e.g., the wireless communication circuit 192), and/or a seal. The front cover forms at least a portion of the front surface of the electronic device. The case includes a rear portion that forms at least a portion of the rear surface of the electronic device and a side portion that forms at least a portion of the side surface of the electronic device. The case is non-conductive. The support is positioned between the front cover and the case. The support includes a first portion and a second portion. The first portion is positioned between the second portion and the side portion. The first conductive pattern is disposed between the first portion and the side portion. The second conductive pattern is disposed between the second portion 312 and the rear portion. The wireless communication circuit is configured to transmit a signal in a designated frequency band via the first conductive pattern and the second conductive pattern. The seal is disposed between the first portion and the rear portion. The first conductive pattern and the second conductive pattern are spaced apart from each other with the first portion interposed therebetween, wherein the first portion extending toward the rear portion through the seal is configured to bring the support into contact with the rear portion. The first portion includes a non-conductive portion (e.g., the first non-metal area 521) at least partially positioned between the first conductive pattern and the second conductive pattern. Based on feeding from the wireless communication circuit, the first conductive pattern and the second conductive pattern are electromagnetically coupled with the non-conductive portion interposed therebetween.

According to an example embodiment of the disclosure, the electronic device may further include a non-conductive support (e.g., the second support 32). The non-conductive support may be positioned between the second portion of the support (e.g., first support 31) and the rear portion of the case. The non-conductive support may be disposed on the second portion. The second conductive pattern may be disposed on the non-conductive support.

According to an example embodiment of the disclosure, the electronic device may further include a printed circuit board (e.g., the first printed circuit board 431). The printed circuit board may be at least partially positioned between the second portion and the non-conductive support (e.g., the second support 32). The printed circuit board may be disposed on the second portion. The wireless communication circuit (e.g., the wireless communication module 192) may be disposed on the printed circuit board. The wireless communication circuit may be electrically connected to the second conductive pattern via a flexible conductor (e.g., the first flexible conductor 63) positioned between the printed circuit board and the second conductive pattern.

According to an example embodiment of the disclosure, the support (e.g., the first support 31) may include a metal. The metal may include a first metal area included in the first portion and a second metal area included in the second portion. The first conductive pattern may be included in the first metal area.

According to an example embodiment of the disclosure, the electronic device may further include a display module comprising a display and a sticking member comprising an adhesive. The display module may be positioned between the front cover and the support (e.g., the first support 31). The display module may be visible through the front cover. The sticking member may be disposed between the front cover and the first portion. The sticking member may be configured to bond the front cover and the support. The sticking member may be configured to block fluid from flowing from the outside of the electronic device into the space between the support and the front cover where the display module is positioned.

Embodiments disclosed in the disclosure and drawings are merely presented as specific examples to easily describe technical content and aid understanding of the disclosure, and are not intended to limit the scope of the disclosure. Accordingly, the scope of the various embodiments of the disclosure should be construed as including changes or modifications of various example embodiments in addition to the various embodiments disclosed herein. In addition, it will be appreciated that any embodiment(s) described herein may be used with any other embodiment(s) described herein. For example although the disclosure is presented in a form that provides a number of embodiments, various embodiments may be linked by reference to the same drawing or drawings. The disclosure may be understood to include all of the combinations of two (or more) embodiments unless there is an contradictions therebetween. That is, when features are presented as optional in the disclosure, all of the combinations of those optional features are included in the disclosure.

What is claimed is:

1. An electronic device comprising:
   a front cover forming at least a part of a front surface of the electronic device;
   a non-conductive case comprising a rear portion forming at least a part of a rear surface of the electronic device and a side portion forming at least a part of a side surface of the electronic device;
   a support disposed between the front cover and the non-conductive case and comprising a first portion and a second portion, the first portion being disposed between the second portion and the side portion;
   a first conductive pattern disposed between the first portion and the side portion;

a second conductive pattern disposed between the second portion and the rear portion and spaced apart from the first conductive pattern;

a wireless communication circuit configured to transmit a signal in a designated frequency band through the first conductive pattern and the second conductive pattern; and a seal disposed between the first portion and the rear portion and configured to block fluid flow from a first area where the first conductive pattern is disposed to a second area where the second conductive pattern is disposed.

2. The electronic device of claim 1, wherein the wireless communication circuit is configured to feed an electromagnetic signal to the second conductive pattern, wherein the first portion comprises a non-conductive portion disposed at least between the first conductive pattern and the second conductive pattern, and wherein the first conductive pattern and the second conductive pattern are electromagnetically coupled through the non-conductive portion.

3. The electronic device of claim 1, wherein, when viewed toward the side surface, the first conductive pattern and the second conductive pattern overlap each other.

4. The electronic device of claim 1, wherein the first conductive pattern and the second conductive pattern are spaced apart from each other with the first portion therebetween, the first portion extending toward the rear portion to contact the support to the rear portion via the seal.

5. The electronic device of claim 1, wherein the first portion extends in a loop shape along the side portion.

6. The electronic device of claim 1, wherein the seal comprises an elastic material compressed between the first portion and the rear portion.

7. The electronic device of claim 1, wherein the seal comprises an adhesive configured to couple the first portion and the rear portion.

8. The electronic device of claim 1, further comprising:

a non-conductive support disposed between the second portion of the support and the rear portion of the case, and disposed on the second portion, wherein the second conductive pattern is disposed on the non-conductive support.

9. The electronic device of claim 8, further comprising:

a printed circuit board disposed at least partially between the second portion and the non-conductive support, and disposed on the second portion, wherein the wireless communication circuit is disposed on the printed circuit board, and wherein the wireless communication circuit is electrically connected to the second conductive pattern through a flexible conductor disposed between the printed circuit board and the second conductive pattern.

10. The electronic device of claim 9, wherein the printed circuit board comprises a ground area, wherein the second portion comprises another ground area electrically connected to the ground area, and wherein the second conductive pattern is electrically connected to the ground area of the printed circuit board or the another ground area of the second portion.

11. The electronic device of claim 1, wherein the support comprises a metal having a first metal area included in the first portion and a second metal area included in the second portion, and wherein the first conductive pattern is included in the first metal area.

12. The electronic device of claim 1, wherein the first portion is configured to be detachable from the side portion.

13. The electronic device of claim 1, wherein the side portion comprises a first side portion and a second side portion, and wherein the first conductive pattern extends from the first side portion to a corner where the first side portion and the second side portion are connected to each other.

14. The electronic device of claim 13, wherein the first conductive pattern further extends to the second side portion.

15. The electronic device of claim 1, further comprising:

a display module comprising a display disposed between the front cover and the support and configured to be visible through the front cover; and a sticking member comprising an adhesive disposed between the front cover and the first portion and configured to bond the front cover and the support and to block fluid from flowing into a space between the support and the front cover on which the display module is disposed.

16. An electronic device comprising:

a front cover forming at least a portion of a front surface of the electronic device;

a non-conductive case comprising a rear portion forming at least a portion of a rear surface of the electronic device and a side portion forming at least a portion of a side surface of the electronic device;

a support disposed between the front cover and the non-conductive case and comprising a first portion and a second portion, wherein the first portion is disposed between the second portion and the side portion;

a first conductive pattern disposed between the first portion and the side portion;

a second conductive pattern disposed between the second portion and the rear portion;

a wireless communication circuit configured to transmit a signal in a designated frequency band via the first conductive pattern and the second conductive pattern; and a seal disposed between the first portion and the rear portion, wherein the first conductive pattern and the second conductive pattern are spaced apart from each other with the first portion interposed therebetween, the first portion extending toward the rear portion such that the first portion contacts the rear portion via the seal, wherein the first portion comprises a non-conductive portion disposed at least partially between the first conductive pattern and the second conductive pattern, and wherein, based on feeding from the wireless communication circuit, the first conductive pattern and the second conductive pattern are electromagnetically coupled with the non-conductive portion interposed therebetween.

17. The electronic device of claim 16, further comprising:

a non-conductive support disposed between the second portion of the support and the rear portion of the case, and disposed on the second portion, wherein the second conductive pattern is disposed on the non-conductive support.

18. The electronic device of claim 17, further comprising:

a printed circuit board disposed at least partially between the second portion and the non-conductive support and disposed on the second portion, wherein the wireless communication circuit is disposed on the printed circuit board, and wherein the wireless communication circuit is electrically connected to the second conductive pattern via a flexible conductor disposed between the printed circuit board and the second conductive pattern.

19. The electronic device of claim 16, wherein the support comprises a metal having a first metal area included in the first portion and a second metal area included in the second portion, and wherein the first conductive pattern is included in the first metal area.

20. The electronic device of claim 16, further comprising:

a display module comprising a display disposed between the front cover and the support and configured to be visible through the front cover; and a sticking member comprising an adhesive disposed between the front cover and the first portion and configured to bond the front cover and the support and to block fluid from flowing into a space between the support and the front cover on which the display module is disposed from an outside of the electronic device.

* * * * *